US008977082B2

(12) United States Patent
Singh et al.

(10) Patent No.: US 8,977,082 B2
(45) Date of Patent: Mar. 10, 2015

(54) OPTICAL SPECTRAL FILTER, ANGULAR FILTER AND POLARISER

(75) Inventors: Kirat Singh, Edmonton (CA); Elmar Prenner, Calgary (CA); Alan D. Streater, Boulder, CO (US)

(73) Assignee: Stream Technologies Inc., Edmonton (CA)

( * ) Notice: Subject to any disclaimer, the term of this patent is extended or adjusted under 35 U.S.C. 154(b) by 822 days.

(21) Appl. No.: 13/008,772

(22) Filed: Jan. 18, 2011

(65) Prior Publication Data

US 2011/0176768 A1 Jul. 21, 2011

Related U.S. Application Data

(60) Provisional application No. 61/295,524, filed on Jan. 15, 2010.

(51) Int. Cl.
*G02B 6/26* (2006.01)
*G02B 6/42* (2006.01)
*G02F 1/01* (2006.01)
*G02B 5/28* (2006.01)
*G02B 27/28* (2006.01)
*G02B 6/10* (2006.01)

(52) U.S. Cl.
CPC .............. *G02F 1/0102* (2013.01); *G02B 5/285* (2013.01); *G02B 27/283* (2013.01); *G02B 6/105* (2013.01)
USPC .................. 385/30; 385/27; 385/36; 385/37; 385/39; 385/131

(58) Field of Classification Search
USPC ............................ 385/27, 30, 36, 37, 39, 131
See application file for complete search history.

(56) References Cited

U.S. PATENT DOCUMENTS

| 5,400,179 A | * | 3/1995 | Ito ................................. 359/588 |
| 5,598,300 A | * | 1/1997 | Magnusson et al. .......... 359/566 |
| 7,088,884 B2 | * | 8/2006 | Gerken et al. ................... 385/24 |
| 2003/0107809 A1 | * | 6/2003 | Chen et al. ..................... 359/498 |

OTHER PUBLICATIONS

Baumeister, P.W., "Optical Tunneling and Its Applications to Optical Filters," Applied Optics 6(5):897-910, May 1967.

(Continued)

*Primary Examiner* — Uyen Chau N Le
*Assistant Examiner* — Chad Smith
(74) *Attorney, Agent, or Firm* — Christensen O'Connor Johnson Kindness PLLC

(57) ABSTRACT

A filter and fabrication process for a thin film filter that is based on frustrated total internal reflection and multiple waveguide layers, in which the waveguide modes are resonantly coupled. The physics of the design is related to prism coupling of light into planar waveguides, and waveguide coupling between planar waveguides in close proximity. Embodiments include a filter that acts as a bandpass filter and polarizer, a filter that acts as a bandpass filter, polarizer and angle filter (spatial filter), a filter that is widely tunable, and a filter that is widely tunable in both peak transmission wavelength and width. Methods of fabrication are disclosed, and methods to correct for manufacturing errors in thin film deposition are described. The filter embodiments can also be used in reflection as notch filters in wavelength and angle, for a particular polarization component.

19 Claims, 20 Drawing Sheets

(56) References Cited

OTHER PUBLICATIONS

Gee, A.E., and H.D. Polster, "A Method for Measuring Extremely Small Non-Uniformities in the Optical Thickness of Evaporated Films," Journal of the Optical Society of America 39(12):1044-1047, Dec. 1949.

Goddard, N.J., et al., "Anti-Resonant Reflecting Optical Waveguides (Arrows) as Optimal Detectors for μTAS Applications," Proceedings of the Third International Symposium on Micro-Total Analysis Systems, μTAS '98 Workshop, Banff, Canada, Oct. 13-16, 1998, 1-page poster.

Haisma, J., and G.A.C.M. Spierings, "Contact Bonding, Including Direct-Bonding in a Historical and Recent Context of Materials Science and Technology, Physics and Chemistry: Historical Review in a Broader Scope and Comparative Outlook," Materials Science and Engineering: R: Reports 37(1-2):1-60, Apr. 2002.

Hulme, J., et al., "Internally-Referenced Resonant Mirror for Chemical and Biochemical Sensing," Analyst 127(9):1233-1236, Sep. 2002.

Iizuka, K., "Engineering Optics," 3d ed., Springer Series in Optical Sciences, vol. 35, 2009, Chap. 15, "Integrated Optics," pp. 399-457.

Kitajima, H., et al., "Multiple Resonance FTR Filters for Nonpolarizing Bandpass Filters," Applied Optics 23(19):3487-3492, Oct. 1984.

Leurgans, P., and A.F. Turner, "Frustrated Total Reflection Interference Filters," Journal of the Optical Society of America 37(12):938, Dec. 1947.

MacLeod, H.A., "Thin Film Optical Filters," 4th ed., CRC Press, Series in Optics and Optoelectronics, 2010, Chap. 2, "Basic Theory," pp. 13-71.

Scheidegger, G.L., "Circle Diagrams Applied to the Design of Thin Film Optical Tunnel Filters," Applied Optics 28(11):2061-2069, Jun. 1989.

Turner, A.F., "Some Current Developments in Multilayer Optical Films," Le Journal de Physique et le Radium 11(7):444-460, Jul. 1950.

\* cited by examiner

`Figure 4A
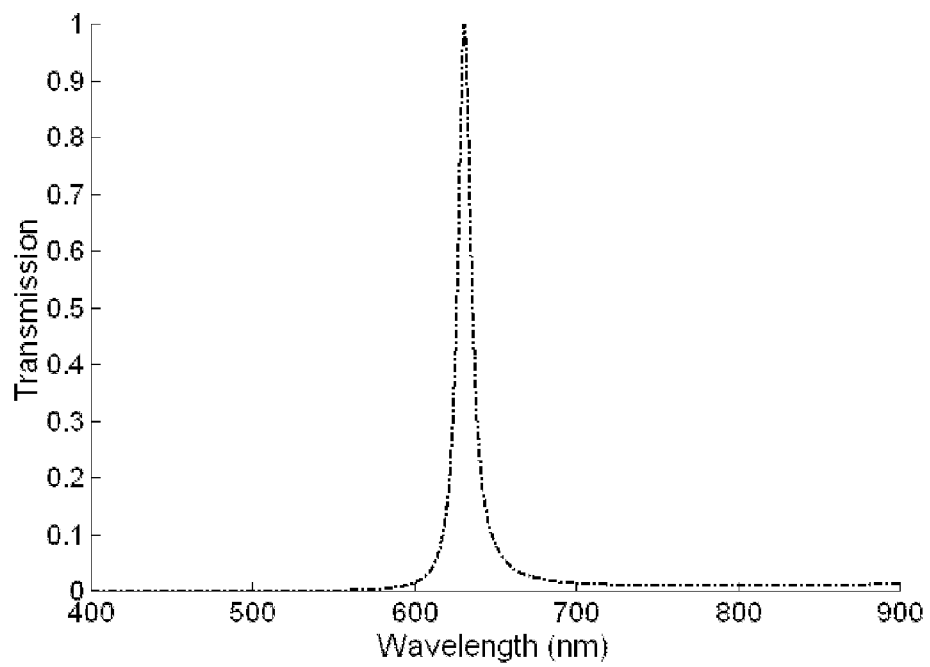
Figure 4B
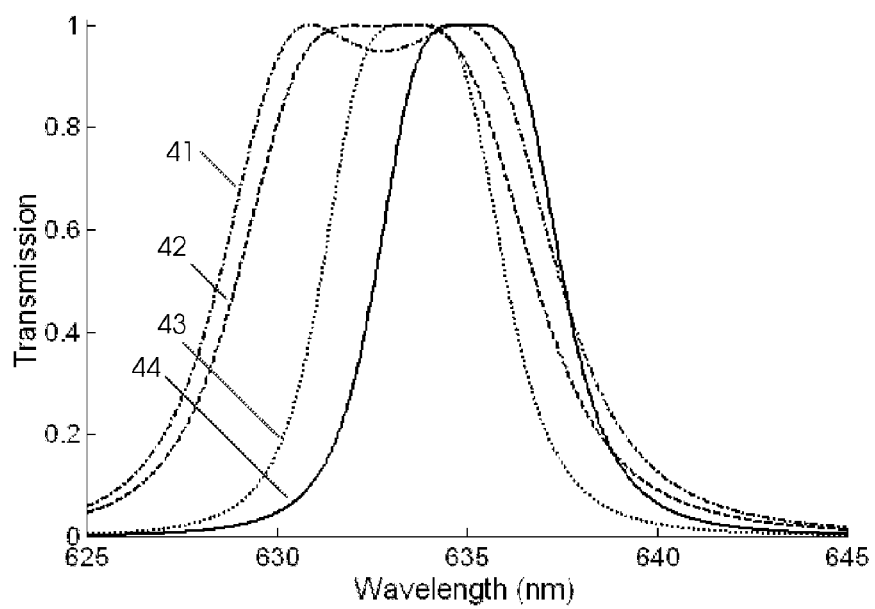

OPTICAL SPECTRAL FILTER, ANGULAR FILTER AND POLARISER

FIELD OF THE INVENTION

This invention relates to an apparatus and method for spectrally filtering and polarising a beam of light.

BACKGROUND OF THE INVENTION

Optical filters are fundamental elements in many optical instruments and setups. In many optical techniques, such as but not limited to, fluorescence spectroscopy, fluorescence anisotropy and Raman spectroscopy, it is important that the excitation light be spectrally distinct from that spectral portion of the fluorescence light that is used for detection. Optical filters that exploit thin-film interference effects to spectrally filter the light are commonly used to filter the excitation light and the fluorescence light.

Linear polarisers are optical elements that, ideally, only transmit one component of the input electromagnetic radiation, where the component of the electric field that is transmitted is oriented parallel to the axis of the polariser.

In addition to these two properties, may also be desirable for an optical element to achieve angular filtering, whereby in order to be transmitted by the device, photons of the selected component of polarizations must not only be within the designed spectral transmission envelope, but it must also be propagating within a given range of angles with respect to the entrance face of the optical element. Spatial filtering is another term that is commonly and synonymously used for angular filtering. Angular filtering is commonly achieved by placing apertures in different places along the direction of beam propagation. This adds to the size and complexity of the device because achieving a high degree of angular filtering requires a long optical path. Hard apertures also cause unwanted diffraction effects. By combining these three common tasks of spectral filtering, angle filtering, and polarization, into a single unit, the design and complexity of many optical instruments and apparatuses can be reduced.

Tunable filters that are based on diffraction gratings are widely used in spectrometers. The peak transmission wavelength of these devices can cover a wide range, but for a given range the bandwidth can only be narrow if the size of the device is large. Another drawback for some applications is that the transmission at the peak wavelength tends to be fairly low, although this can be mitigated in limited spectral regions by blazes and holographic gratings. Other types of filters have been developed for many of these applications. Birefringent (Lyot) filters are intermediate in size and bandwidth. Fabry-Perot filterscan be quite small, but are limited in bandwidth, or more precisely in the finesse, which is the ratio of the isolation range to the wavelength width of the transmission range. Tunable thin film filters based on multi-cavity designs have been used in telecommunications. These can be small, and the tuning range is limited. Thin film filters can also be based on Rugate designs.

Tunable filters based on spatially-varying thin film designs have been developed, as for example in U.S. Pat. No. 6,700,690, "Tunable variable bandpass optical filter," Philip E. Buchsbaum et al., Mar. 2, 2004. The tunable filter described in U.S. Pat. No. 6,700,690 is based on a traditional filter design that is based on Mirror structures and Fabry Perot spacer layers. The background material in U.S. Pat. No. 6,700,690 nicely describes other similar tunable filters.

Turner discloses a single waveguide filter with frustrated total reflection interference in U.S. Pat. No. 2,601,806.

SUMMARY OF THE INVENTION

In an embodiment, there is disclosed an apparatus and method for filtering a beam of light such that only those photons for a specific polarization component that satisfy specific spectral requirements are transmitted. All other photons within a larger spectral range are reflected by the optical structure within tolerances for rejection. In addition, for some embodiments, only those photons for a specific polarization component that satisfy specific spectral requirements that are also incident on the optical structure within a given range of angles are transmitted. We also describe embodiments that are tunable, meaning that parameters that describe the filter characteristics can be changed and controlled by mechanical motion, application of an electric field, or other forms of stimulus.

In an embodiment of a filter there is disclosed a prism or other optical element with a number of optical thin film layers deposited upon it that forms a series of waveguide structures, with a second identical prism or other optical element placed in contact with the coated face of the first prism, thus forming a cuboid structure.

In an embodiment of a filter there is disclosed a prism or other optical element coated with two waveguide structures, with a second identical prism or other optical element placed in contact with the coated face of the first prism. The two waveguide structures are different to each other, and this structure is referred to as an asymmetrical structure. In an embodiment, there are five thin film layers between the prisms, of which two are planar waveguide layers and three are lower refractive index layers that form planar cladding layers for the waveguide structures, form a coupled optical system wherein optical energy transfers from the first waveguide structure to the second waveguide structure only if all three of the following conditions are satisfied: (1) that the wavelength of the light is within a specific range; (2) that the light has a specific polarisation component; and (3) that the angle of the incoming light, with respect to the plane of the waveguiding layers, is within a specific range. For incoming light within operating characteristics, this leads to transmission of optical energy of the specific polarisation component for wavelengths and angles in these ranges.

In an embodiment of a filter there is disclosed a filter in which there are two waveguide structures that are identical, i.e. are of the same material and are the same in dimensions. This embodiment of the invention has similar polarisation and spectral filtering properties to those of the second embodiment, but in angle it is tilt-tunable due to the symmetry of the structure. This means that the wavelength range that is transmitted is different for different angles of the incoming light entering the structure.

Several embodiments are described that are tunable by other mechanisms. One embodiment uses a material for one of the layers that is temperature sensitive, meaning that its refractive index changes in response to temperature. Another embodiment makes use of a spatially-varying thin film structure.

In an optical system, all of the embodiments can also be used in reflection. In this case, the filter rejects light of a specified incoming angle that is in the selected narrow range and of the selected polarization component. For some embodiments light with all incoming angles other than the selected direction will be reflected, regardless of wavelength and polarisation.

Several embodiments of the devices described here allow the transmission wavelength(s) to be tuned. Such a capability is potentially useful for applications that require the excitation wavelength to be changed in order, for example, to excite different fluorophores within the same sample or different fluorophores within different samples. Other applications for tunable optical filters described here are in spectroscopy, tunable lasers, LIDAR, and optical communications.

BRIEF DESCRIPTION OF THE DRAWINGS

Embodiments will now be described by way of example with reference to the accompanying simplified, diagrammatic, not-to-scale drawings:

FIG. 4A shows the transmission spectrum after step 2 in the design process. In this example the goal is a filter with peak transmission at 635 nm, wavelength width 5 nm, with a flat-top shape near the peak.

FIG. 4B shows the transmission spectra after step 3 41, step 4 42, step 5 43, and step 6 44, for an example of the design process. In this example the goal is a filter with peak transmission at 635 nm, wavelength width 5 nm, with a flat-top shape near the peak.

DETAILED DESCRIPTION

Figure 1A:
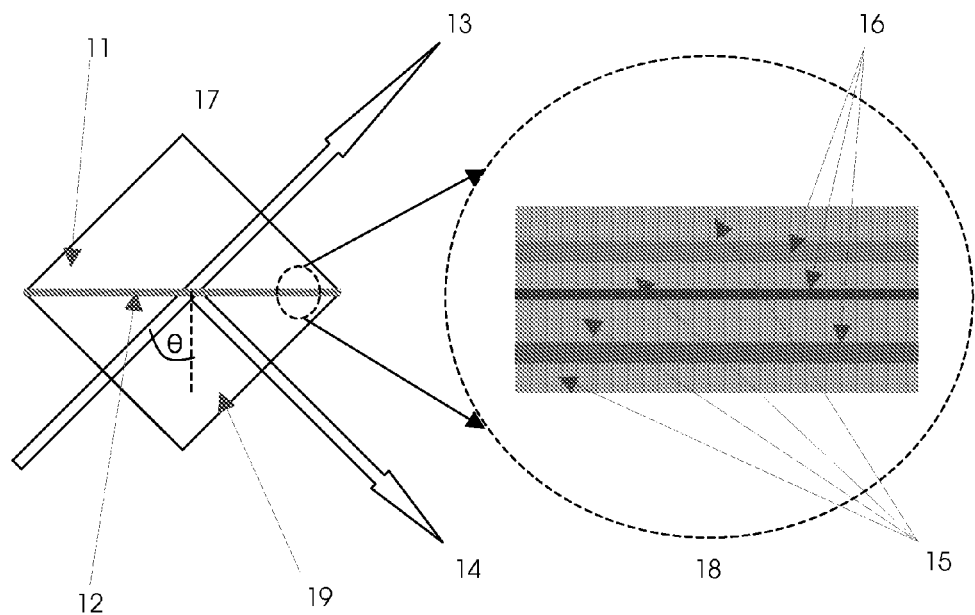
FIG. 1A is a schematic representation of an embodiment of a filter, described as the first embodiment in the text. It comprises planar waveguide layers 16 and spacer layers 15. In this example of a structure with an arbitrary number of planar waveguide layers, three such layers are depicted, all dissimilar to the other planar waveguide layers. The entrance prism 19 is identical to the exit prism 11.

All terms not defined herein have their common art recognized meanings. To the extent that the following description is of a specific embodiment or a particular use of the invention, it is intended to be illustrative only, and not limiting of what is claimed. Immaterial modifications to what is described may be made without departing from what is claimed.

In all embodiments described here, the input element is described as a prism. However, the input element may, in addition to a prism, be a phase grating, transmission grating or any element that allows the incoming photons to be coupled into a waveguide mode or modes by phase matching. All embodiments of the input element will have material properties including a refractive index.

In all embodiments described here, the output element is described as a prism. However, the output element may, in addition to a prism, be a phase grating, transmission grating or any element that allows the photons to be coupled out from the waveguide mode or modes by phase matching. All embodiments of the output element will have material properties including a refractive index, which can be different from the material properties of the input element.

All examples given in the embodiments are designed to operate in or near the visible part of the electromagnetic spectrum. However, operation is not limited to this part of the electromagnetic spectrum, and the examples given are illustrative only.

The term "in optical contact" is used in the present application to indicate that two adjacent optical materials are in contact with each other such that there is a minimal gap between the materials. This term is used to differentiate between such a contact and a non-optical physical contact between two materials, in which case there may be areas where there is a substantial gap between the two materials, due to surface imperfections, dust or non-planar surface of one or both of the materials. In this case a substantial gap is one that is thicker than about $0.1\lambda_1$, where $\lambda_1$ is the shortest wavelength over which the device is intended to operate. Thin film layer deposited by evaporation, sputtering, and atomic layer deposition techniques are always assumed to be in good optical contact with each other and with the substrate material, where any gap is much smaller than a substantial gap. The process of optical contacting is a common method that puts two glass surfaces that have been fabricated separately in optical contact by taking advantage of attractive forces between carefully prepared surfaces.

The term "bandpass filter" is used to indicate a device that accepts incoming electromagnetic radiation with wavelength or wavelengths within a first wavelength band, and predominantly selects for further transmission electromagnetic radiation with wavelengths within a second wavelength band that is within the first wavelength band. The word predominantly is use to indicate that some electromagnetic radiation with wavelength outside the second wavelength band will transmit, and some electromagnetic radiation that within the second wavelength band will not be rejected, but in both cases the fractional amount is smaller than a specified level.

The term "notch filter" is used to indicate a device that accepts incoming electromagnetic radiation with wavelength or wavelengths within a first wavelength band, and predominantly selects for further transmission electromagnetic radiation with wavelengths outside a second wavelength band that is within the first wavelength band. A bandpass filter or a notch filter can also filter or act on the electromagnetic radiation in other ways, such as angle filtering or selecting a particular polarization component of the electromagnetic radiation.

The term "angle filter" or synonymously "spatial filter" is used to indicate a device that accepts incoming electromagnetic radiation with a propagation direction that is in a first angular band, and predominantly selects for further transmission electromagnetic radiation with propagation angles within a second angular band that is within the first angular band.

The term "polariser" is used to indicate a device that accepts incoming electromagnetic radiation with all possible components of polarization, and passes predominantly the component of that incoming radiation in a particular direction of polarization.

A device can act as a combination of a bandpass filter, spatial filter, and polarizer (or any two of these) by acting on the electromagnetic radiation in a way that would be similar to using each type of device in succession. For example, a filter that acts as a bandpass filter and a polarizer acts on the electromagnetic radiation in a way that is similar to applying first a bandpass filter to the incoming radiation and then to the resulting radiation applying a polarizer, resulting in radiation that is both polarized and predominantly restricted in wavelength to the second wavelength band. A notch filter can also be included in these combinations. In this application a filter can refer to a device that acts in any of these combinations.

An optically coupled waveguide structure is a waveguide structure that has a core comprising a waveguide layer of higher refractive index, surrounded by a cladding comprising cladding layers of lower refractive index in optical contact with the waveguide layer on each side. All optical modes that are used in the operation of the filter are optically leaky. The waveguide structures are planar, being formed of planar layers. The modes supported by an optical waveguide structure may be either leaky modes or guided modes. A guided mode of an optical waveguide is one in which the optical energy propagating within that mode is confined by total internal reflection (TIR) at the core-cladding interface. However, a leaky mode of an optical waveguide is one in which the optical energy propagating within that mode, is confined within the waveguide not by total internal reflection at the core-cladding interface, but by frustrated total internal reflection through a cladding of finite thickness. Since TIR is 100%, energy is not lost from a guided mode of the optical waveguide, except if the material or materials of the planar waveguide layer and/or the planar cladding layers are optically absorbing or scattering. However, a leaky mode of an optical waveguide loses energy during propagation, since frustrated total internal reflection through the finite planar cladding layer is always less than 100%, and light leaks out from the waveguide. The real part of the complex mode index of a leaky mode is less than the refractive index of the cladding. For a given leaky mode of a waveguide structure, the characteristic distance over which a substantial fraction (half or $1/e^2$ for some definitions) of optical intensity (proportional to the square of the electric field amplitude) is dissipated is called the propagation length, as described for example in Engineering Optics, Springer, 3rd edition, 2009, by K. Iizuka.

A planar waveguide layer in a waveguide structure is a single layer of material that has a thickness that changes at most gradually over spatial positions, gradually meaning that the change in thickness over a distance equal to the propagation length will be smaller than an amount that would cause the filter properties to change substantially as described below. Similarly, a planar cladding layer in a waveguide structure is a single layer of material that has a thickness that changes gradually over spatial positions, gradually meaning that the change in thickness over a distance equal to the propagation length will be smaller than an amount that would cause the filter properties to change substantially as described below.

Various embodiments of a filter will now be described having regard to the accompanying figure.

In the first embodiment, there is provided a filter for spectrally filtering, polarising and for some embodiments also angularly filtering input light. The relevant figures are FIG. 1A, FIG. 1B and FIG. 1C.

The structure comprises:

Input prism 19, assumed to be of an isotropic material, with refractive index 1.52

First layer, adjacent to the input prism, assumed to be of an isotropic material, with refractive index 1.38, and thickness 0.55 microns Second layer, adjacent to the first layer, assumed to be of an isotropic material, with refractive index 1.85, and thickness 0.03335 microns Third layer, adjacent to the second layer, assumed to be of an isotropic material, with refractive index 1.38, and thickness 1.1 microns Fourth layer, adjacent to the first layer, assumed to be of an isotropic material, with refractive index 1.75, and thickness 0.44517 microns Fifth layer, adjacent to the first layer, assumed to be of an isotropic material, with refractive index 1.38, and thickness 1.1 microns Sixth layer, adjacent to the first layer, assumed to be of an isotropic material, with refractive index 1.65, and thickness 0.31072 microns Seventh layer, adjacent to the first layer, assumed to be of an isotropic material, with refractive index 1.38, and thickness 0.55 microns Output prism 11, assumed to be of an isotropic material, with refractive index 1.52

All layers and prisms are in optical contact with adjacent layers or prism. The input prism 19, optical thin-film structure 12 and output prism 11 are in optical contact with each other. Shown in the enlargement 18, the optical thin-film structure 12 comprises three higher refractive index planar waveguide layers 16 clad by lower refractive index spacer layers 15. The spacer layers between each planar waveguide layer can be conceptually split, so that each planar waveguide layer is surrounded by a planar cladding layer on each side, forming a leaky waveguide structure. When two or more leaky waveguide structures are close, the modes are coupled. As illustrated in FIG. 1A, the three planar waveguide layers 16 are of differing thicknesses and refractive indices. When between two planar waveguide layers, the lower refractive index spacer layers 15 can conceptually be split into two planar cladding layers that each are in optical contact with one of the planar waveguide layers to form part of the planar waveguide structure. The planar cladding layers can be of differing thicknesses, but are of materials with the same refractive index. This is a specific form chosen for illustration of a general thin-film structure that has a series of waveguide structures, with two or more waveguide structures in the series, and arbitrary material choices for the materials and thickness of the planar waveguide layers and lower refractive index planar cladding layers, subject to further conditions described below.

Figure 1B:
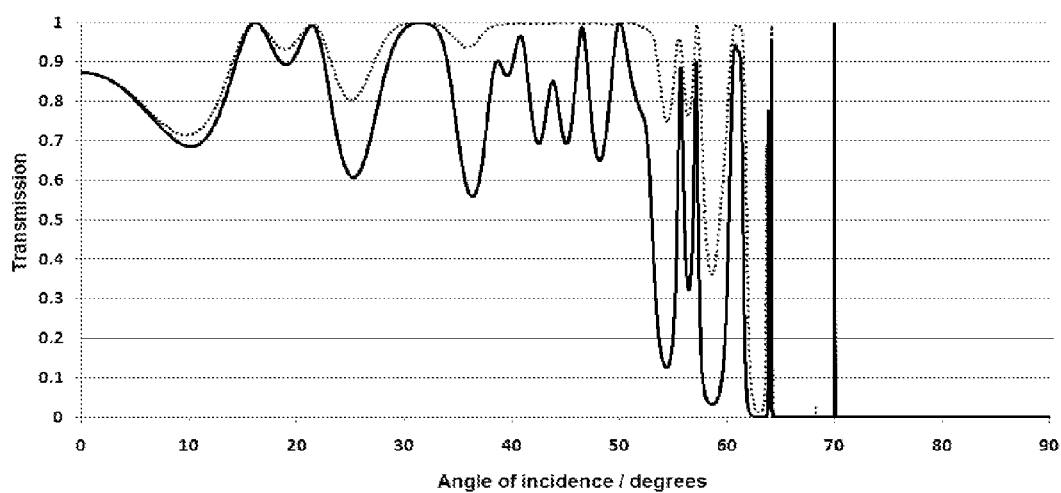
FIG. 1B shows the transmission for both TE (solid line) and TM (dotted line) monochromatic light at a wavelength of 405 nm, as a function of the angle of incidence $\theta$, where $\theta$ is defined as the angle between the path of the beam and a line at 90 degrees to the plane of the multilayer coating. $\theta$ is measured within the coupling prism, as shown in FIG. 1A.
Figure 1C:
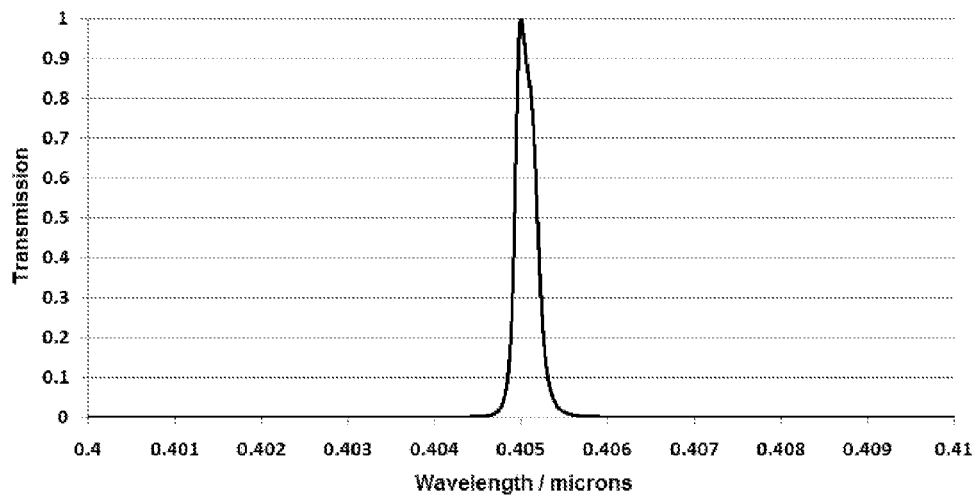
FIG. 1C shows the transmission for TE polarized light at an angles of incidence, $\theta$, of 70.0 degrees, for wavelengths from 0.4 microns to 0.41 microns.

For the theoretical calculations shown in FIG. 1B and FIG. 1C and in other figures, we assumed that the beam diameter is much larger than the coupling length. Under this assumption the infinite plane wave solution will be valid, so we can use standard thin film modeling, for example, as described in Thin-Film Optical Filters, Fourth Edition, Taylor & Francis (CRC Press) (2010), by A. Macleod.

All materials in the filter that we are disclosing are considered linear in their response to the electromagnetic radiation, so that without loss of generality we can consider an input beam of electromagnetic radiation that is incident on the thin film structure at a particular angle of incidence θ, and a particular wavelength. A portion of the beam 13 is transmitted and the remainder that is not scattered or absorbed 14 is reflected. Significant transmission occurs only if the beam is able to resonantly excite a mode in each of the waveguide structures. In a properly tailored structure according to the design principles described below, for a given angle of incidence θ, resonant excitation of a mode in each of the waveguide structures only occurs for wavelengths that are within a specific narrow range (the second wavelength band in the claims) and polarisation component that is one of two orientations, which we will call the selected polarisation. These two orientations are real (linearly polarised) and orthogonal if the materials are isotropic. For the wavelengths in the specific narrow range, only the selected polarisation component will be transmitted, and the other polarisation component will be reflected. The specific narrow range wavelengths that, for a given angle of incidence θ, can resonantly excite the waveguide modes in the series of waveguide structures in the thin film structure, providing high transmission, is strongly dependent on the form of the thin film structure. In general, the range of wavelengths that, for a given angle of incidence θ, can resonantly excite the waveguide modes, is a function of the material choice and thickness of the waveguide layers, and how optically leaky the modes are. In the present embodiment, this range of wavelengths can be deduced from FIG. 1C, which shows the transmission of both TE and TM polarisations as a function of wavelength, assuming that the optical beam is incident on the thin film structure at an angle of incidence of 70 degrees. The specific narrow range of wavelengths of high transmission is characterised by parameters including a peak transmission wavelength and a wavelength width. The wavelength width is described as the range of wavelengths around the peak transmission wavelength for which the transmission is higher than a certain value. For this embodiment, the full width half maximum of the transmission peak is 3.4 nanometers. The same definition of "specific narrow range of wavelengths" will be applied elsewhere in this application, and also corresponds to the second wavelength band that is described in the claims.

All embodiments of the device take advantage of intrinsic polarisation properties of waveguides, wherein, in properly tailored structures according to the design principles described below, the mode index and therefore resonant angle of excitation is dependent on the polarisation state of the mode.

In the second embodiment, there is provided a filter for spectrally filtering, polarising and angularly filtering input light. The relevant figures are FIG. 2A, FIG. 2B, FIG. 2C, and FIG. 2D.

The structure comprises:

Input prism 29, assumed to be of an isotropic material, with refractive index 1.52

Figure 2A:
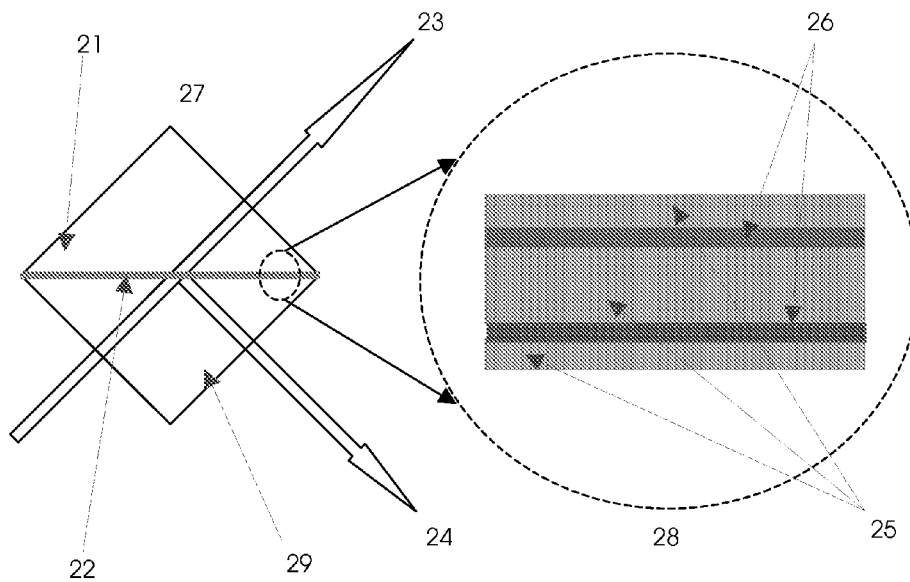
FIG. 2A is a schematic representation of an embodiment of a filter, described as the second embodiment in the text. It comprises planar waveguide layers 26 and spacer layers 25. This is an example of a structure with two dissimilar waveguide structures. The entrance prism 29 is identical to the exit prism 21.
Figure 2B:
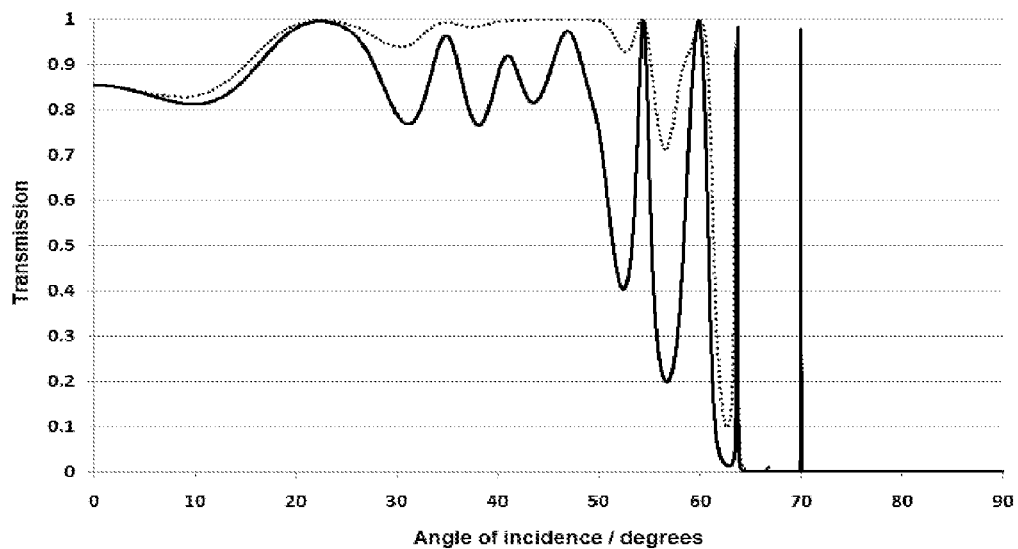
FIG. 2B shows the transmission for both TE and TM monochromatic light at a wavelength of 405 nm, as a function of the angle of incidence $\theta$, where $\theta$ is defined as the angle between the path of the beam and a line at 90 degrees to the plane of the multilayer coating. $\theta$ is measured within the coupling prism, as shown in FIG. 1A. The solid line is the TE polarization, and the dotted line is the TM polarization.
Figure 2C:
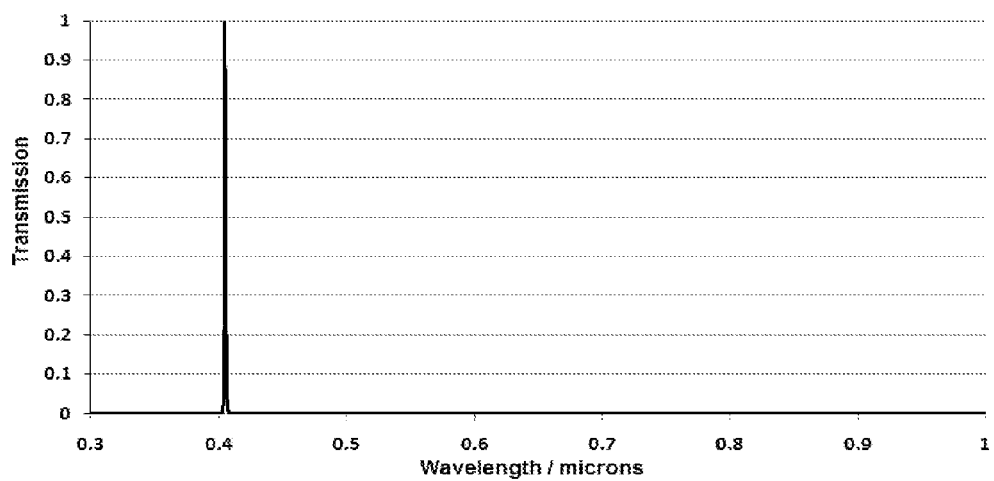
FIG. 2C shows the transmission for both TE and TM light at an angle of incidence, $\theta$, of 70 degrees, for wavelengths from 0.3 microns to 1.0 microns. The TM transmission is too low to be apparent at the scale used in the graph. The prominent peak thus represents the TE transmission.
Figure 2D:
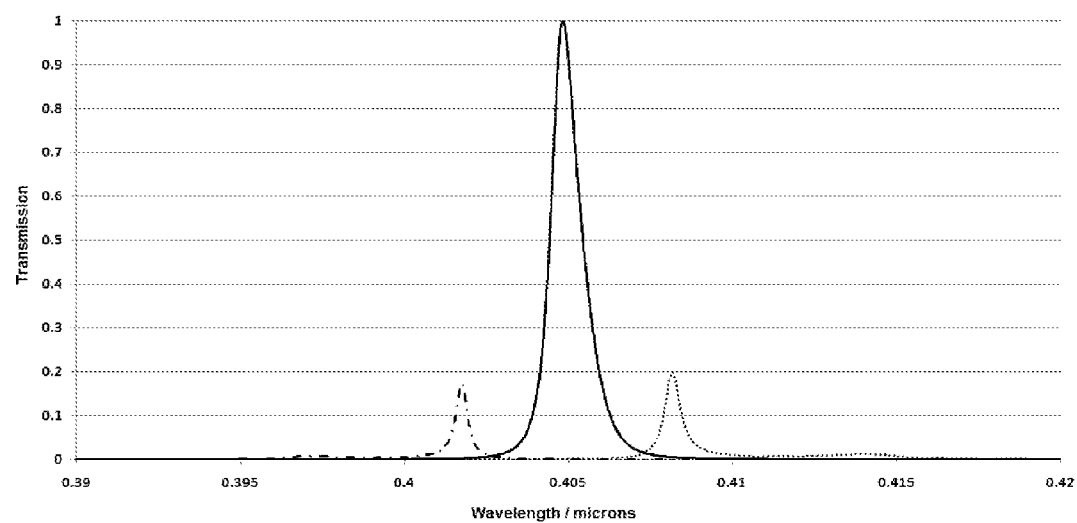
FIG. 2D, shows the spectral transmission of TE polarized light at angle of incidence 69.8° (dotted), 70° (solid) and 70.2° (dashed), for the structure illustrated in FIG. 2A and described in the text.

First layer, adjacent to the input prism, assumed to be of an isotropic material, with refractive index 1.38, and thickness 0.5 microns Second layer, adjacent to the first layer, assumed to be of an isotropic material, with refractive index 1.85, and thickness 0.03336 microns Third layer, adjacent to the second layer, assumed to be of an isotropic material, with refractive index 1.38, and thickness 1 micron Fourth layer, adjacent to the third layer, assumed to be of an isotropic material, with refractive index 1.65, and thickness 0.31062 microns Fifth layer, adjacent to the fourth layer, assumed to be of an isotropic material, with refractive index 1.38, and thickness 0.5 microns Output prism 21, assumed to be of an isotropic material, with refractive index 1.52, in optical contact with the fifth layer The input prism 29, optical thin-film structure 22 and output prism 21 are in optical contact with each other. Shown in the enlargement 28, the optical thin-film structure 22 comprises two planar waveguide layers 26 clad by lower refractive index spacer layers 25. As illustrated in FIG. 2A, the two planar waveguide layers 26 are of differing thicknesses and refractive indices, and the lower refractive index spacer layers 25 are of differing thicknesses but of the same refractive index. This is a specific form chosen for illustration of a thin-film structure that has two planar waveguide layers, and arbitrary material choice for the planar waveguide and lower refractive index spacer layers.

The input beam is incident on the thin film structure at an angle of incidence θ. A portion of the beam 23 is transmitted and the remainder 24 is reflected. Transmission occurs only if the beam is able to resonantly excite a mode in each of the waveguide structures. In a properly tailored structure according to the design principles described below, for a given angle of incidence θ, resonant excitation of a mode in each of the planar waveguide layers only occurs if the wavelength is within a specific narrow range and if the radiation has a non-zero polarisation component in one of two orthogonal orientations. Only this resonant polarisation component will be transmitted, and the other polarisation component will be reflected for wavelengths in the second wavelength band.

Energy can only couple between waveguide modes if the polarisation of each of the resonant modes in each waveguide structure is the same, i.e. TE (transverse electric) polarised mode in one waveguide will only couple energy into a TE polarised mode in the adjacent waveguide structure. Similarly a TM (transverse magnetic) polarised mode in one waveguide will only couple energy into a TM polarised mode in the adjacent waveguide structure.

A special case is if all of the resonant modes are identical, then for the embodiment of only two waveguides the structure is also symmetrical about its center (i.e. a structure comprising a prism, coated with five thin film dielectric layers, with a second identical prism placed in optical contact with the thin film structure, wherein the thin film structure is symmetrical, meaning that first layer is identical in thickness and material to the fifth layer, and that the second layer is identical in thickness and material to the fourth layer). One feature of a symmetrical structure, or any embodiment in which all modes that are excited by E-M radiation with wavelength in the second wavelength band are identical, is that photons at higher and lower wavelengths than the design wavelength can also resonantly excite waveguide modes and be transmitted by the structure if they are incident on the thin film structure at a different resonant angle, because the resonant angle is a function of the wavelength. Thus, light at wavelengths that the structure is designed to reflect can in fact be transmitted if that light is off-axis and propagating in a direction that causes it to be incident on the thin-film structure at an angle that is resonant for that wavelength. This feature can be used to allow for tilt-tuning, whereby the whole structure is tilted with respect to the axis of the incoming beam, thereby changing the angle of incidence and thus changing the wavelengths of high transmission (second wavelength band).

However, in cases where the dominant wavelength of the input beam is known, and where tuning is not necessary, the feature of tilt-tuning in symmetric structures is un-necessary and un-desirable. In these cases the use of an asymmetric structure, as described here and illustrated in FIG. 2A, ensures that only light whose wavelength is within a specified range, which is incident on the thin-film structure over specified angular range, centered on the resonant angle, and whose polarisation state matches the design transmission polarisation state, will be transmitted. All other light will be reflected, irrespective of its wavelength and angle of incidence and polarisation. This is demonstrated in FIG. 2D, where the transmission spectrum is shown for the design angle of incidence of 70 degrees (solid), and also for an angle of incidence of 69.8 degrees (dotted) and for an angle of incidence of 70.2 degrees (dashed). Note that for angles on either side of the design angle the peak transmission levels (and integrated transmission levels) are less that at the maximum transmission angle of 70 degrees.

The phenomenon that is exploited in order to remove the tilt-tunable feature is dispersion. For electromagnetic radiation propagating in the filter disclosed here there are two sources of dispersion: material dispersion and waveguide dispersion. Material dispersion comes from a frequency-dependent response of a material to waves. Waveguide dispersion is an effective dispersion of a waveguide structure, and occurs when the mode index of a waveguide mode depends on wavelength, and arises from the act of confining the mode within the waveguide structure. By designing around planar waveguide layers of dissimilar materials with dissimilar material dispersion characteristics, it is possible to develop a structure that transmits only electromagnetic radiation whose wavelength is within a specified range, which is incident on the thin-film structure over specified range centered on the resonant angle, and whose polarisation state matches the design transmission polarisation state. All other light will be reflected, irrespective of its wavelength and angle of incidence and polarisation.

Similarly, by designing around planar waveguide layers of dissimilar thicknesses and therefore dissimilar waveguide dispersion characteristics, it is possible to develop a structure that transmits only light whose wavelength is within a specified range, which is incident on the thin-film structure over specified range, centered on the resonant angle, and whose polarisation state matches the design transmission polarisation state. All other light (within a specification) will be reflected, irrespective of its wavelength and angle of incidence and polarisation.

A combination of material dispersion and waveguide dispersion can be used to achieve the same effect.

An example of a situation in which such an asymmetric design is advantageous is as a laser filter, which is used to remove residual non-dominant wavelengths from a laser source. Given that the light output from the laser, either directly or by use of lenses, is highly collimated, and also that the dominant laser wavelength is spectrally narrow, tilt-tuning is not ideal in most situations. The use of a non-symmetric structure as described here prevents light that propagate off-axis from transmitting through the structure, and also prevents light that is on-axis but at non-dominant wavelengths from transmitting through the structure.

In the third embodiment, there is provided a filter for spectrally filtering, polarising and angularly filtering input light. A demonstration filter corresponding to this embodiment has been fabricated using methods below and tested. Results will be presented below. The relevant figures are FIG. 3A, FIG. 3B and FIG. 3C.

The structure depicted here is:

Input prism 39, assumed to be of an isotropic material, with refractive index 1.52

Figure 3A:
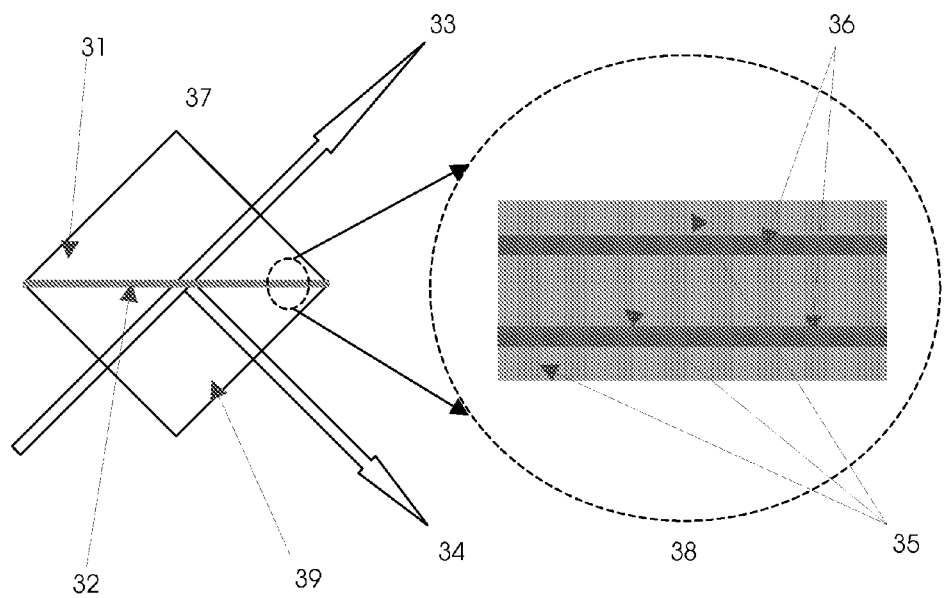
FIG. 3A is a schematic representation of an embodiment of a filter, described as the third embodiment in the text. It comprises planar waveguide layers 36 and spacer layers 35. This is an example of a thin film structure with two identical waveguide structures. The entrance prism 39 is identical to the exit prism 31.

First layer, adjacent to the input prism, assumed to be of an isotropic material, with refractive index 1.38, and thickness 0.5 microns Second layer, adjacent to the first layer, assumed to be of an isotropic material, with refractive index 1.65, and thickness 0.0656 microns Third layer, adjacent to the second layer, assumed to be of an isotropic material, with refractive index 1.38, and thickness 1 micron Fourth layer, adjacent to the third layer, assumed to be of an isotropic material, with refractive index 1.65, and thickness 0.0656 microns Fifth layer, adjacent to the fourth layer, assumed to be of an isotropic material, with refractive index 1.38, and thickness 0.5 microns Output prism 31, assumed to be of an isotropic material, with refractive 1.52, in optical contact with the fifth layer The input prism 39, optical thin-film structure 32 and output prism 31 are in optical contact with each other. Shown on the insert 38, the optical thin-film structure 32 comprises two planar waveguide layers 36 clad by lower refractive index spacer layers 35. As illustrated in FIG. 3A, the two planar waveguide layers 36 are of identical thickness and refractive index, and the lower refractive index spacer layers 35 are of differing thicknesses but of the same refractive index. This is a specific form chosen for illustration of a thin-film structure that has two or more identical waveguide structures, and symmetrical form.

The input beam is incident on the thin film structure at an angle of incidence θ. A portion of the beam 33 is transmitted and the remainder 34 is reflected. Transmission occurs only if the beam is able to resonantly excite a mode in each of the planar waveguide layers. In a properly tailored structure of this embodiment according to the design principles described below, for a given angle of incidence θ, resonant excitation of a mode in each of the waveguide structures only occurs if the wavelength is within a specific narrow range (the second wavelength band) and the polarisation is one of two orthogonal orientations. Only one of these polarisation components will be transmitted, and the other polarisation component will be reflected.

Energy can only couple between waveguide modes if the polarisation of the mode in each waveguide is the same, i.e. TE (transverse electric) polarised mode in one waveguide will only couple energy into a TE polarised mode in the adjacent waveguide. Similarly a TM (transverse magnetic) polarised mode in one waveguide structure will only couple energy into a TM polarised mode in the adjacent waveguide structure.

Figure 3B:
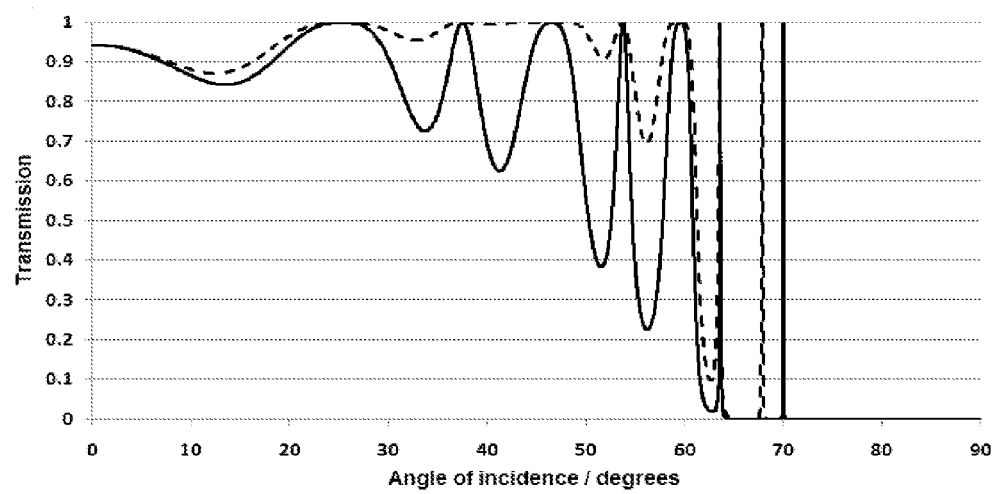
FIG. 3B shows the transmission for both TE (solid) and TM (dashed) monochromatic light at a wavelength of 405 nm, as a function of the angle of incidence $\theta$, where $\theta$ is defined as the angle between the path of the beam and a line at 90 degrees to the plane of the multilayer coating. $\theta$ is measured within the coupling prism, as shown in FIG. 1A.
Figure 3C:
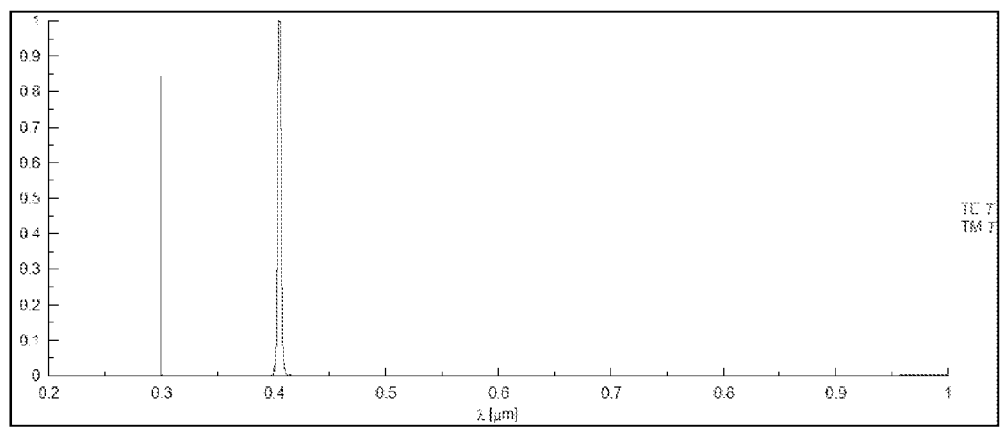
FIG. 3C shows the transmission for both TE (Peak at 0.405 micron) and TM (peak near 0.3 microns) light at an angle of incidence, $\theta$, of 70 degrees, for wavelengths from 0.2 microns to 1.0 microns.
Figure 3D:
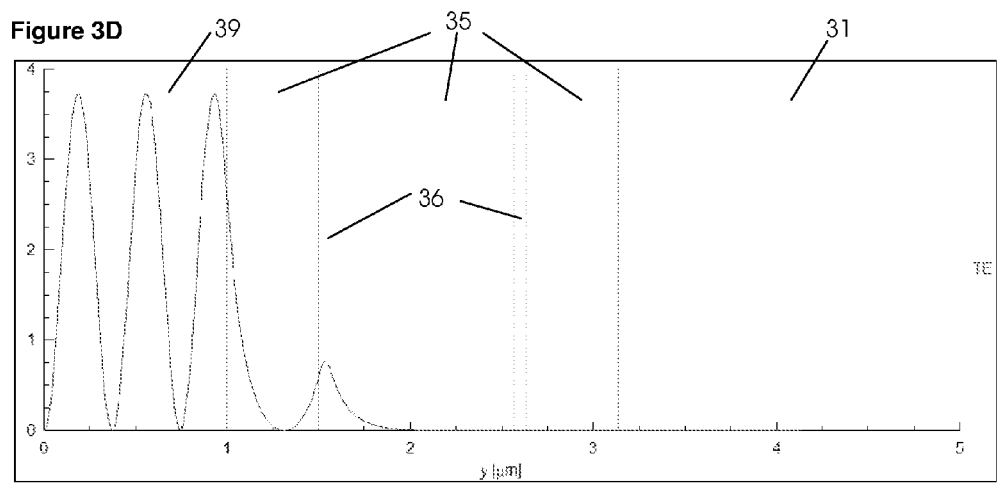
FIG. 3D shows the intensity profile for the TE polarisation when the angle of the light beam is 69 degrees to the plane of the multilayer structure, 70 degrees being the resonant angle of the TE mode. Elements 31,35,36,39, are the elements described in FIG. 3A.
Figure 3E:
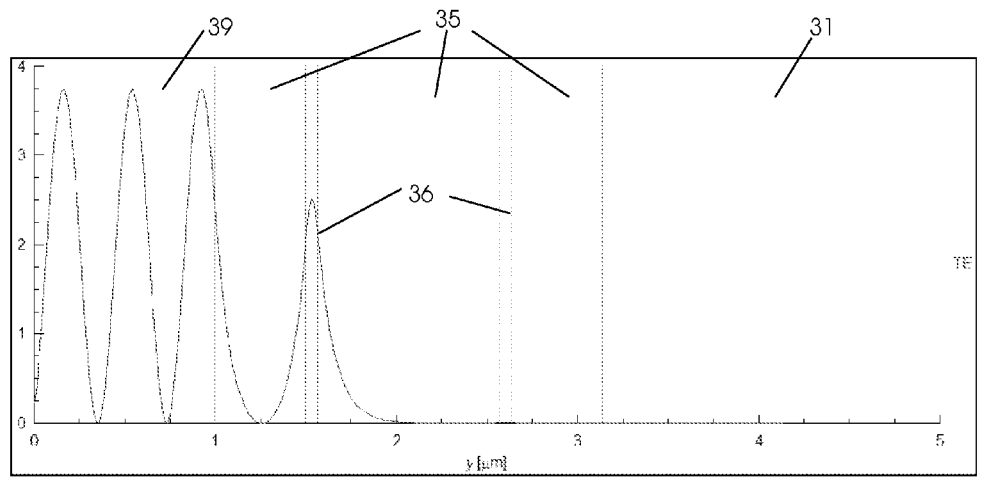
FIG. 3E shows the intensity profile for the TE polarisation when the angle of the light beam is 69.5 degrees to the plane of the multilayer structure, 70 degrees being the resonant angle of the TE mode. Elements 31,35,36,39, are the elements described in FIG. 3A.

As discussed previously, this symmetrical embodiment has the feature that it can be tilt-tuned, whereby the whole structure is tilted with respect to the axis of the incoming beam, thereby changing the angle of incidence and thus the transmission wavelength. FIG. 3D shows the intensity (proportional to the square of the electric field amplitude) of light within the structure, if TE polarised light is incident on the multilayer thin film structure at an angle of 69 degrees. Elements 31, 35, 36, and 39 are the elements described in FIG. 3A. This is one degree lower than the resonant angle of 70 degrees, at which the TE mode will be excited. The mode intensity shown in FIG. 3D shows that there is very weak excitation of the mode in the first planar waveguide layer (the planar waveguide layer 36 closest to the input prism 39), but that there is no light intensity in the second planar waveguide layer. Light is therefore not able to transmit through the structure, and is totally reflected. FIG. 3E shows the intensity of light within the structure, if TE polarised light is incident on the multilayer thin film structure at an angle of 69.5 degrees. This is 0.5 degree lower than the resonant angle of 70 degrees, at which the TE mode will be excited. The mode intensity shown in FIG. 3E shows that there is very weak excitation of the mode in the first planar waveguide layer (the planar waveguide layer 36 closest to the input prism 39), and there is minimal light intensity in the second planar waveguide layer. Light is therefore substantially reflected from the structure, and transmission is very weak.

Figure 3F:
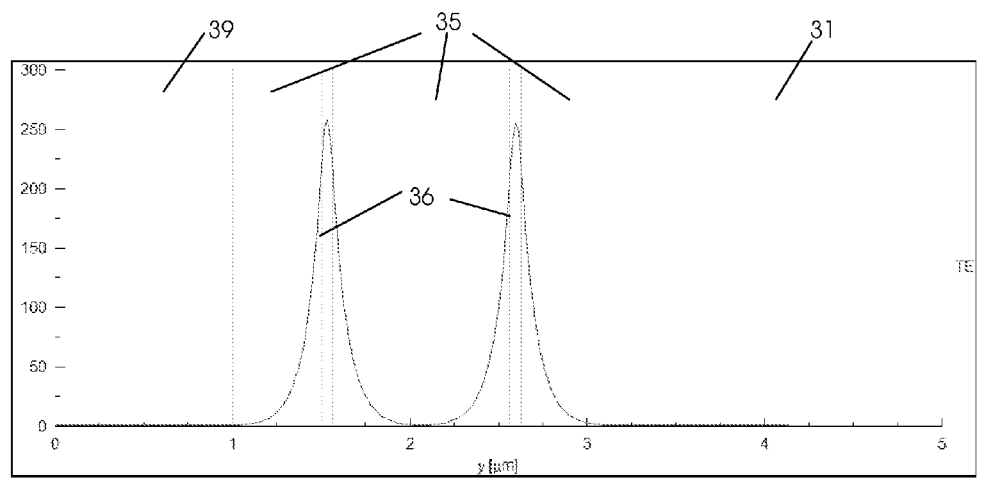
FIG. 3F shows the intensity profile for the TE polarisation when the angle of the light beam is 70 degrees to the plane of the multilayer structure, 70 degrees being the resonant angle of the TE mode. Elements 31,35,36,39, are the elements described in FIG. 3A.

FIG. 3F shows the intensity of light within the structure, if TE polarised light is incident on the multilayer thin film structure at an angle of 70 degrees. Elements 31, 35, 36, and 39 are the elements described in FIG. 3A. This is at the resonant angle at which the TE mode is excited. The mode intensity shown in FIG. 3F shows that there is very strong excitation of the mode in the first planar waveguide layer (the planar waveguide layer 36 closest to the input prism 39), and also very strong excitation of the mode in the second planar waveguide layer. Light is therefore totally transmitted through the structure, as shown in FIG. 3B.

Figure 3G:
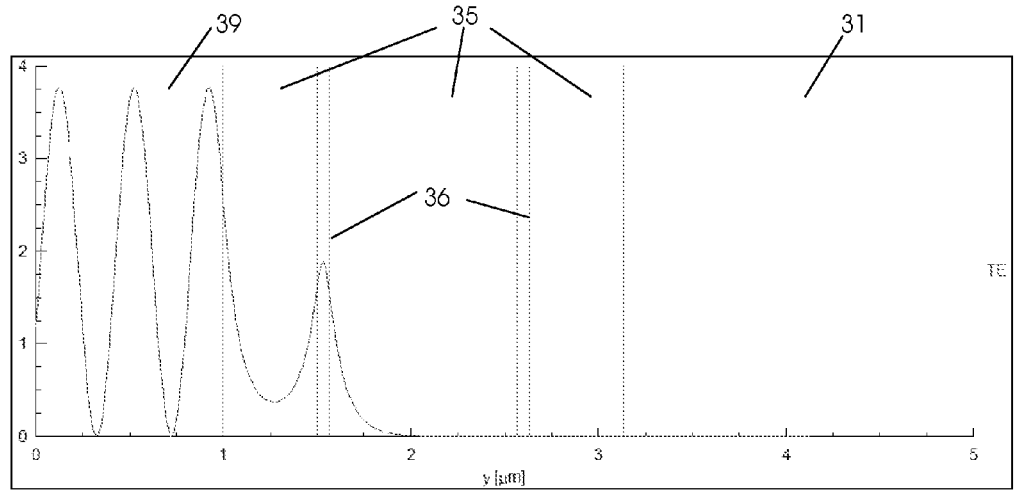
FIG. 3G shows the intensity profile for the TE polarisation when the angle of the light beam is 70.5 degrees to the plane of the multilayer structure, 70 degrees being the resonant angle of the TE mode. Elements 31,35,36,39, are the elements described in FIG. 3A.

FIG. 3G shows the intensity of light within the structure, if TE polarised light is incident on the multilayer thin film structure at an angle of 70.5 degrees. Elements 31, 35, 36, and 39 are the elements described in FIG. 3A. This is 0.5 degree higher than the resonant angle of 70 degrees, at which the TE mode will be excited. The mode intensity shown in FIG. 3G shows that there is very weak excitation of the mode in the first planar waveguide layer (the planar waveguide layer 36 closest to the input prism 39), and there is minimal light intensity in the second planar waveguide layer. Light is therefore substantially reflected from the structure, and transmission is very weak.

Figure 3H:
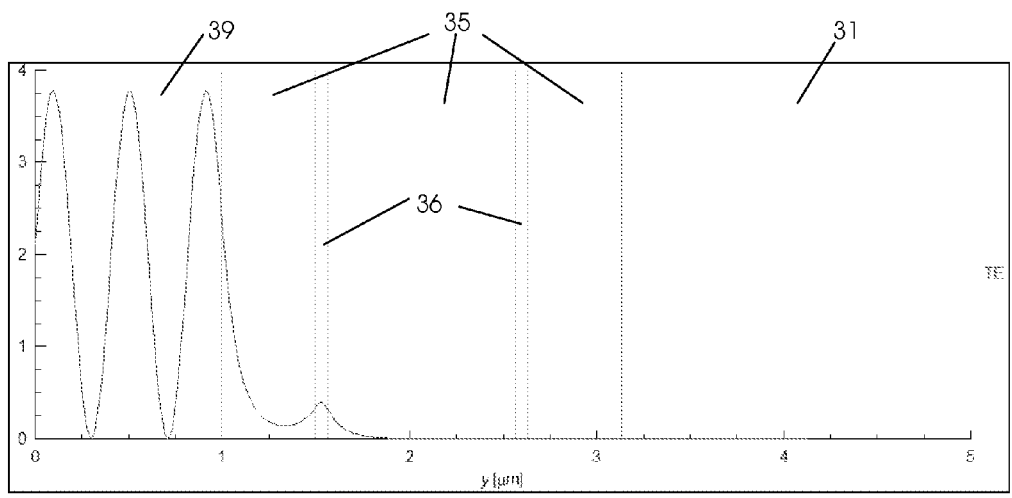
FIG. 3H shows the intensity profile for the TE polarisation when the angle of the light beam is 71 degrees to the plane of the multilayer structure, 70 degrees being the resonant angle of the TE mode. Elements 31,35,36,39, are the elements described in FIG. 3A.

FIG. 3H shows the intensity of light within the structure, if TE polarised light is incident on the multilayer thin film structure at an angle of 71 degrees. Elements 31, 35, 36, and 39 are the elements described in FIG. 3A. This is 1 degree higher than the resonant angle of 70 degrees, at which the TE mode will be excited. The mode intensity shown in FIG. 3H shows that there is very weak excitation of the mode in the first planar waveguide layer (the planar waveguide layer 36 closest to the input prism 39), and there is minimal light intensity in the second planar waveguide layer. Light is therefore substantially reflected from the structure, and transmission is very weak.

The situations depicted in FIGS. 3D, 3E, 3G and 3H show that when the first planar waveguide layer (the planar waveguide layer 36 closest to the input prism 39), is excited by a light beam that is not at the resonant angle at which the mode is excited, the optical intensity in that layer is very low, and little or no coupling of energy occurs between the two planar waveguide layers. However, when the first planar waveguide layer (the planar waveguide layer 36 closest to the input prism 39), is excited by a light beam that is at (or very close to) the resonant angle at which the mode is excited, the optical intensity in that layer is very high, and energy from the first planar waveguide layer is coupled to the second planar waveguide layer, and then transmitted through the output prism 31. This mode intensity profile in this case is shown in FIG. 3F.

For total transmission to occur, it is not a sufficient condition that the mode in the first waveguide structure be excited. The mode in the second waveguide structure must also be excited, at the same angle of incidence, for the energy from the mode in the first waveguide structure to couple through to the second waveguide structure. Thus, for energy to transmit maximally at a given wavelength, polarisation and angle of incidence, the two waveguide structures must be optically symmetric (though not necessarily structurally symmetric), meaning that the mode index of the mode in the first waveguide structure must be equal to the mode index of the mode supported by the second waveguide structure. This condition can be satisfied if the first planar waveguide layer is of the same material as the second planar waveguide layer (and therefore of the same refractive index) and also of the same thickness as the second planar waveguide layer, and also that the spacer layers between the prisms and the planar waveguide layers are of identical material (and therefore of the same refractive index) and thickness. In this case, the structure is not only optically symmetric, but also structurally symmetric, and a mode supported by the first waveguide structure is the same mode as the mode supported by the second waveguide structure.

In summary, all embodiments disclosed here will act as a bandpass filter and polariser. Embodiments for which non-identical waveguide modes with different dispersion characteristics are excited by radiation in the second wavelength band at the designed angle of incidence, act as a bandpass filter, a spatial filter (or angle filter), and a polariser.

Here we present a method of design for bandpass filters that are based on two or more planar waveguide structures. There are various commonly-used parameters for describing or specifying a filter, including but not limited to:

Peak transmission wavelength

Bandwidth at a particular transmission level

Blocking levels for wavelength ranges outside of the specific narrow range (the second wavelength band in the claims), often specified in terms of optical density (OD), which is the negative of the base–10 log of the transmission Polarisation extinction, which is the transmission of the peak transmission for the selected component divided by the transmission at that same wavelength for the orthogonal polarization Flatness over a specified wavelength range, specified as a maximum allowable absolute value for the derivative of the transmission with respect to wavelength or frequency Slope of phase over a specified range, often specified as a group delay (GD)

Second derivative of phase over a specified range, often specified as a group delay dispersion (GDD) or group velocity dispersion (GVD).

We demonstrate the design process using an example goal of a bandpass filter for TE polarization (relative to the direction of the reflection) with peak transmission at 635 nm, with a full-width-half-maximum of 5 nm (i.e. T>0.5 from 632.5 nm to 637.5 nm), and with a flat-top shape near the maximum (e.g. minimum derivative of the transmission with respect to wavelength, from 634.5 nm to 635.5 nm, which will also do a fairly good job of minimizing the GDD over this range). Steps of the design process are as follows, and relevant figures are FIG. 4A, and FIG. 4B:

1. We will use SF11 as a prism material (a commercial high refractive index glass from the Schott Corporation, with refractive index 1.7783 at 635 nm), and SiO2 and Ta2O5 as our low refractive index materials (index 1.4844 and 2.1321, respectively, at 635 nm). We select 60 degrees as a convenient angle of incidence, which is higher than the critical angle for the interface from the prism to air. We at first ignore the evanescent coupling from the cladding layers, and calculate the thickness for the planar waveguide layers of the high index material surrounded by an infinite cladding layer of the low index material, such that there is a guided waveguide mode at the desired peak wavelength for the desired polarization component. A description can be found in standard texts, for example in Engineering Optics, Springer, 3rd edition, 2009, by K. Iizuka. The wavelengths of other modes can also be calculated for both polarizations, to make sure that other wavelengths do not fall in regions and polarizations where high blocking is desired. For asymmetrical structures these other modes will be suppressed because they are not simultaneously resonant for all waveguide layers, but the blocking OD levels will still be lower where these resonances occur. In our example we use the resonance of mode order 1 (one zero of the electric field amplitude) which has a thickness of 252.55 nm for a Ta2O5 material.
2. Next we consider the coupling of the modes, but only in the limit where beam diameter is much larger than the coupling length. In cases where this is not the case, but the beam diameter is still somewhat larger than the propagation length, this step will provide a reasonable starting point for a more sophisticated calculation. Under this assumption the infinite plane wave solution will be valid, so we can use standard thin film modeling, for example as described in Thin-Film Optical Filters, Fourth Edition, Taylor & Francis (CRC Press) (2010), by A. Macleod. We start with a single-waveguide structure with the waveguide layer and two cladding layers around it. The thickness values of the waveguide layers are set to the thickness that is calculated in the first step. The angle of incidence is 60 degrees. We start with cladding layers that are roughly half of the wavelength at the desired transmission wavelength, and then adjust the cladding thickness, keeping the thickness of the two cladding layers the same, so that the width in wavelength is about twice the desired wavelength width. The cladding thickness for this example is 400 nm, and the resulting transmission spectrum for the single-waveguide structure is shown in FIG. 4A.
3. We now set up a two-waveguide, five-layer design with two identical waveguide structures from the previous step. The cladding layers between the two waveguide layers will be twice as thick (800 nm) because there is conceptually a cladding layer on each side of each waveguide layer. The resulting transmission spectrum is shown in FIG. 4B 41.
4. Next we adjust the thickness of the middle cladding layers between the waveguide layers to achieve the flat-top shape. For our example the adjusted middle layer thickness is 852 nm. The resulting transmission spectrum is shown in FIG. 4B 42.
5. We adjust all of the cladding layers by a common factor to adjust the width of the transmission peak to the desired thickness In our example the resulting low refractive index layer thickness values are 448 nm, 954.2 nm, and 448 nm. The resulting transmission spectrum is shown in FIG. 4B 43. For an asymmetrical design we can adjust the other cladding layers independently, working to maintain the desired shape.
6. Next we adjust the thickness of the waveguide layers, keeping both thickness values the same, in order to tune the centroid of the peak to the desired maximum transmission wavelength. This adjusts for small shifts in the resonant frequencies that are caused by the introduction of the evanescent mode coupling through the thin film model. For our example this results in a thickness for both planar waveguide layers of 253.16 nm. The resulting transmission spectrum is shown in FIG. 4B 44. For an asymmetrical design it is best to multiply all layers by a common factor to achieve this shift.
7. If the blocking levels are not large enough (in OD), then we can reduce the wavelength width by increasing the cladding layer thickness values, or if it is not desirable to reduce the wavelength width we can introduce more waveguide structures into the thin film structure. Several of these steps are analogous to design techniques for standard bandpass filters that are based on mirror stacks and Fabry-Perot spacer layers, where the thickness of the cladding layers is analogous to the number of elements in the mirror stacks, the thickness of the waveguide layers here is analogous to the thickness of the spacer layers, and the number of waveguide structures here is analogous to the number of spacer layers.
8. In some cases it is appropriate to set target values and use standard multivariable optimization techniques to obtain a more refined design.
9. The thickness of each layer can now be varied in the model, resulting in a change in the transmission spectrum or reflection spectrum. Given specifications on the desired filter parameters, this can be used to infer layer thickness tolerances. For determining fabrication tolerances for the layer thickness values it must be considered that accumulations of small changes in the layer thickness for several or many layers can lead to filter parameters that are not within the specifications.

A procedure similar to the procedure that is used in step 9 for determining individual layer tolerances can be used to more precisely determine how small the thickness of the layer thickness of the planar waveguide layer and the planar cladding layers must be for a spatially-varying thin film (described below) structure of the filter to be a gradual change. We can define gradual to mean that the change in thickness over distances corresponding to the propagation length must be substantially smaller than the amount that would change the filter properties substantially. For most purposes we can require that the peak transmission wavelength does not change substantially in comparison with the wavelength width of the specific narrow range of high transmission (the second wavelength band in the claims), and that the peak transmission level does not change substantially. For most purposes a reasonable definition of a substantial change in the peak transmission wavelength is 10% of the specific narrow range of transmission, and a substantial change in the transmission level is 10%.

In an optical system, the filter can be used in transmission as a bandpass filter and polariser. For asymmetrical designs the filter also acts as an angle filter (spatial filter) in transmission. These filters can be designed to have wide blocking regions without the use of absorbing materials, so that essentially all of the light that is not transmitted is reflected. The device can therefore be used in reflection as a notch filter.

Figure 5:
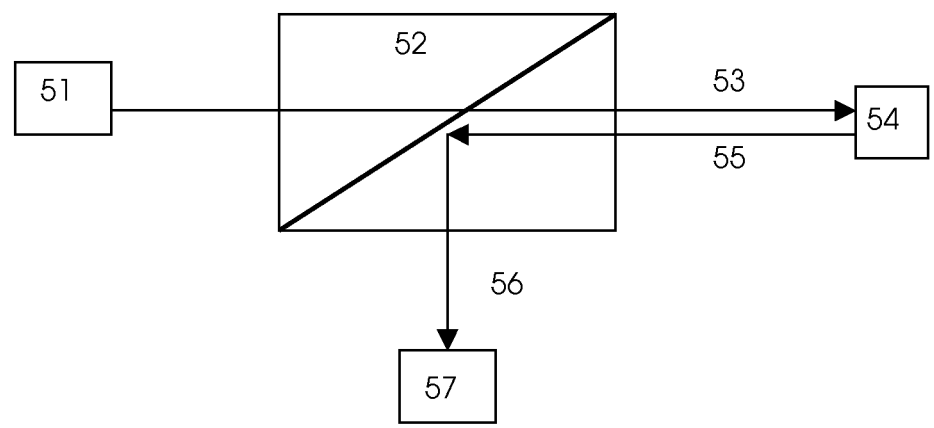
FIG. 5 is a schematic representation of the method of using a filter to transmit only desired laser light and also to reject unwanted laser light in collecting a return signal.

The filter can also be used in both transmission and reflection. An example would be in Raman scattering, where laser light is cleaned up in transmission and then the back-scattered signal is collected after reflection, as shown in FIG. 5.

Light from the laser 51 enters the filter 52 described herein that acts as a bandpass filter and polarizer (and for some embodiments also acts as a spatial filter) to transmit light in a more pure polarisation state and with less light in unwanted wavelengths (and for some embodiments with less light in unwanted directions) 53. This light irradiates a sample 54, resulting in backscattered light 55. The same filter 52 is then used in reflection as a notch filter, resulting in reflected light 56 that has laser light removed. This light is possibly filtered further if desired, and measured by a detection system 57.

An example of one possible fabrication process to produce the structures described here is given below. Turner fabricated a single-waveguide filter [A. F. Turner, "Some current developments in multilayer optical films," Le Journal de Physique et le Radium, Vol 11, 444-460 (July 1950)], and noted that the transmission was low. In a subsequent paper, Baumeister [Philip W. Baumeister, "Optical Tunneling and Its Applications to Optical Filters," May 1967/Vol. 6, No. 5/APPLIED OPTICS 897] concluded that scattering was the problem, and that the device was impractical because scattering in the highly-resonant layers leads to a degradation in the transmission level. In the device described here with more than one waveguide layer, scattering can degrade the transmission in the same way. In addition, the multiple waveguide devices here have the additional fabrication difficulty that the thickness of the waveguide layers must often be fabricated with extreme precision. Common methods can be applied for manufacturing the filter, but some special considerations must be taken to overcome these manufacturing difficulties. In the intervening years since the single waveguide structure filter was found to be impractical, deposition processes have improved. Methods for high-precision control of layer thickness and sensitivity to scattering have been developed for the fabrication of traditional multi-cavity bandpass filters that are based on mirror stacks and Fabry Perot spacer layers.

In the following description of the fabrication steps, we describe as an example the fabrication of a demonstration filter, and show measured results. This example is illustrative only, and not restrictive with regard to the fabrication method that can be used to produce the filters.

The first fabrication step is to form the input and output devices. The diagonal surfaces are fabricated carefully for subsequent coating and bonding. The required preparation may change for different bonding processes.

For our demonstration filter, triangular prisms were fabricated out of a solid piece by grinding and polishing flat surfaces. Parts are typically glued into stainless steel wedge tools in order to hold them for grinding and polishing surfaces to tight angle tolerances. In order to facilitate subsequent optical contacting, the finished surfaces were made flat. (For example, a surface figure of $\frac{1}{10}$th wave at 633 nm over the central 80% area with the same shape, and best effort to include the entire surface. The surface outside of the clear aperture should not be raised higher than the average height within the central 80%, so that the surface is rolled-off rather than raised.) The surface should also be free of large defects (e.g. 10/5 using the ANSI/OEOSC OP1.002-2009 surface-imperfection standard, or ISO 100110-7: 2008(E): 5/1×0.05 5/L1×O. 001). A small bevel was polished onto the edge around the diagonal surface. This is to prevent raised edges and debris from interfering with the subsequent optical contacting. The surface roughness should be of low roughness (e.g. less than 5 Angstroms root-mean-square or better, as measured by a white light interferometer microscope system, which naturally averages the surface height over spatial areas on the order of 20 square microns). The top and bottom surfaces can be left rough-ground.

The next fabrication step is to deposit the thin film structure. For some bonding techniques there is a choice of whether we deposit the structure onto the input device, the output device, or part of the structure on each. The thin film coating is applied with a coating process that leaves a high-density, low-absorbing, and low-scattering thin film. Current appropriate coating methods include or may include in the future: ion beam sputtering (IBS), magnetron mputtering, ion-assisted evaporation, and atomic layer deposition. We used IBS deposition because it is generally known to have low losses due to scattering and absorption. The control of layer thickness and refractive index is particularly important. For example the demonstration filter, which is a two-waveguide symmetrical embodiment with a transmission peak at 405 nm and a full-width-half-maximum on the order of 1 nm, using $SiO_2$ and $Ta_2O_5$ for the low and high refractive index materials, respectively, the matching of the thickness of the two-waveguide layers must be within about 5 parts in 10,000 in order to maintain a peak transmission of more than 90%. For this embodiment, if both waveguide layers are too thick or too thin, but still remain matched, then the angle of incidence can be adjusted to tune the peak transmission wavelength. For asymmetrical designs the refractive index and layer thickness must be controlled even more carefully.

Several strategies are available for insuring that the thickness of the sensitive waveguide layers are correct to the required accuracy. For the demonstration filter, which is symmetrical about the center, we coated half the design on the diagonal surfaces of both the input and output prisms in a single coating run, and then optically contacted the coated prisms together in order to form the complete thin film structure. The advantage of using this process is that the layer thickness and refractive index values from each side (especially the two high refractive index waveguide layers) will be well matched even if the coating process is not extremely precise. To further improve this matching we used a single-rotation system in which the part-to-part variations are especially small. Finally, the parts were oriented in the same direction relative to the radius of the single rotation platform in the coating chamber, so that when they are contacted together the residual thickness gradients are likely to be in opposite directions for the two halves of the thin film structure. Thus there is likely to be a spatial region near the middle of the part where the thickness values of the two waveguide layers match most precisely. In subsequent testing this position is found by translating either the light beam from a laser (with the desired peak transmission wavelength) or the part, while also making slight adjustments to the angle of incidence, seeking the region on the coating that yields the maximum peak transmission. This spatial variation and tuning can also accommodate slight differences in the refractive index of the materials.

Another viable strategy for achieving the tight matching tolerance is optical monitoring, which is commonly used for the fabrication of traditional narrow bandpass filters. In this process the transition of the thin film coating is monitored in situ as the film is deposited, and the transmission signal is used to determine the endpoint of deposition for each layer. For the traditional bandpass filters based on quarter wave mirror stacks and spacer layers, the layer thickness control requirements are similar, but one difference is that the critical layers for the designs described herein do not have thickness values that are integer numbers of quarter waves. There are methods to analyze and predict endpoint times for non-quarter wave layers.

The next step is to bond the coated input and output devices together using a common method. Possible bonding techniques include, but are not limited to: optical contacting (including surface-activated optical contacting); hydroxide assisted bonding; and various types of transparent glues.

For the demonstration filter, we used optical contacting. Surfaces are first cleaned and chemically prepared, usually with a series of solvents, sometimes a strong aqueous base, and water rinses. Then the two prisms are pressed together, forming a bond. Subsequent processing can strengthen the bond. [For a review, see Jan Haisma and G. A. C. M. Spierings, Materials Science and Engineering: R: Reports, Volume 37, Issues 1-2, 5 Apr. 2002, Pages 1-60]. Hydroxide Assisted Bonding is similar to optical contacting, but the contact is done in a strong aqueous base. Glues include thermally curing, UV curing, and time-based curing glues, and they should be transparent in the region of interest (the first wavelength band). If the bond forms a layer, then that layer can be incorporated into the coating design. For example, part or all of the low refractive index cladding layer that is against the output devices can be made up of the glue material, usually with a low refractive index that matches the refractive index of the other cladding layers. Alternatively, the entire thin film structure can be deposited on either the input or output device, with a glue that matches the refractive index of the output or input device, respectively.

In the optical contacting of the demonstration filter the process seemed to result in a small gap, with a thickness that is inferred from the experimental transmission spectrum. This gap could also be corrected by designing the middle cladding layer with a slightly smaller thickness. We found that for the IBS coating, the stress in the coating causes a deformation of the hypotenuse surface of the prisms near the sharp thin tip, which interfered somewhat with the optical contacting process. This problem can be managed by pre-forming the surface figure of the prisms so that after coating the surfaces are more flat.

Standard thin film anti-reflection coatings can also be deposited to the other surfaces using a common method (for example, but not limited to, evaporation or ion beam sputtering), in order to reduce stray reflections as the light enters and exits the filter. Additionally, coatings on the entrance and exit surfaces can enhance blocking in spectral regions where desired.

Figure 6:
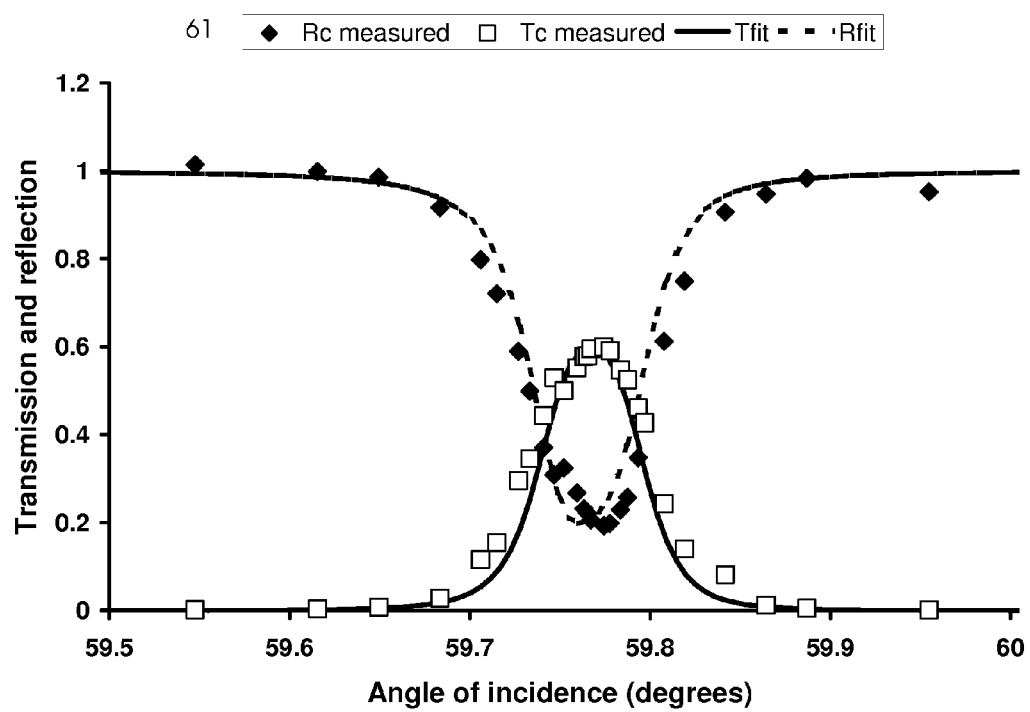
FIG. 6 shows experimental results for a demonstration filter that was fabricated with the method described herein. All results are shown as a function of the angle of incidence inside the input prism material, for transverse-electric polarized light from a 405 nm narrow-band laser, The fractional transmission of the coating Tc (see legend 61) and reflection of the coating Rc (see legend) are experimental results. The fractional transmission Tfit (see legend) and reflection Rfit (see legend) are calculated results for TE-polarized light at 405 nm, based on standard thin film modeling, where thickness of layers and extinction in the materials have been adjusted within fabrication tolerances to approximately match the data.

The layer structure for the demonstration filter was designed for a 405 nm bandpass filter for transverse electric (TE) polarization, with a wavelength width that is on the order of 1 nm. The design is as follows: Angle of incidence 60°, layers: (Medium SF11); SiO2 308.0 nm; Ta2O5 157.09 nm; SiO2 620.0 nm; Ta2O5 157.09 nm; SiO2 308.0 nm (Substrate SF11). In the theoretical predictions described below, dispersion is included, with refractive index values at 405 nm assumed to be: SiO2 1.4978; Ta2O5 2.2360; SF11 1.8422. These materials and refractive index values are exemplary and the layer thickness values can be adjusted for different refractive index values for different coating processes. Experimental results for the transmission of the thin film structure are shown in FIG. 6 (see legend 61 for experimental curves on FIG. 6). We measured the transmission of the fabricated filter with a 405 nm laser. We also measured the transmission of the SF11 substrate material, and used this information and theoretical calculations for the transmissions and reflections of the front and back interface, in order to infer the transmission and reflection for the thin film structure alone. We first translated the filter horizontally, and adjusted the angle of incidence in order to find the horizontal position and angle for maximum 405 nm transmission. Then at this optimal spatial position, we measured the transmission as a function of incident angle on the front surface. (The angular position corresponding to normal incidence on the front face is identified by the retro-reflection of the laser beam.) These external angles are converted to internal angles in the SF11 material onto the coated diagonal using Snell's law and the prism geometry. In this case we were able to infer from transmission and reflection measurements that there was probably a small effective gap in the middle of the optical contact.

The beam diameter for the measurements is approximately 0.1 mm, which is many times larger than the propagation length, which theoretically for the ideal design is 0.016 mm. Thus standard thin film modeling that is based on plane wave solutions to the Maxwell equations should apply. Theoretical calculations that are also shown in FIG. 6 account for scattering, the central gap, and layer thickness errors within manufacturing tolerances. The figures show the theoretical transmission Tfit and reflection Rfit (see legend 61 for curve labels). For these calculations the overall thickness of all layers (centering) is adjusted 0.64% shorter than the ideal design, the waveguide layer thickness values are split by 0.055%, the middle layer thickness was increased by 7% (50 nm), and an absorption of 6.5×10−5 is assumed for the high-index material. These thickness adjustments are within manufacturing tolerances except for the middle layer adjustment. It is reasonable to assume that a gap from the optical contacting contributed to the effective increase in the middle layer. The assumed absorption is reasonable for an IBS thin film material at a wavelength of 405 nm.

We believe that we can improve the process by allowing for the small gap in the design, and by improving the scattering levels in the thin film materials.

We also measured the blocking at selected wavelengths. Results are shown in Table 1, where the wavelength is given in nm, Ts (coating) are measured values for the transverse-electric (TE) polarization, Ts(fit) are calculated values for TE polarization based on manufacturing errors assumed for the Tfit curve in FIG. 6, Tp (coating) are measured values for the transverse-magnetic (TM) polarization, and Tp(fit) are calculated transmission values for TM polarization, also using manufacturing errors assumed for the Tfit curve in FIG. 6.

TABLE 1

| Wavelength | Ts (coating) | Ts (fit) | Tp (coating) | Tp (fit) |
| --- | --- | --- | --- | --- |
| 405 | 0.6 | 0.6 | $5.97 \times 10^{-6}$ | $1.0 \times 10^{-8}$ |
| 532 | $5.7 \times 10^{-5}$ | $7.3 \times 10^{-7}$ | $2.9 \times 10^{-4}$ | $3.8 \times 10^{-6}$ |
| 635 | $4.1 \times 10^{-6}$ | $6.5 \times 10^{-6}$ | $4.5 \times 10^{-5}$ | $9.2 \times 10^{-5}$ |
| 810 | $7.8 \times 10^{-5}$ | $1.2 \times 10^{-4}$ | $3.2 \times 10^{-3}$ | $4.0 \times 10^{-3}$ |

The measurements are fairly difficult. The 532 nm measurements are probably confounded by leaked pump light at 1064 nm from the frequency doubled Nd:VO4 laser. With this and other experimental considerations, these results show general agreement between theory and experiment.

Figure 7:
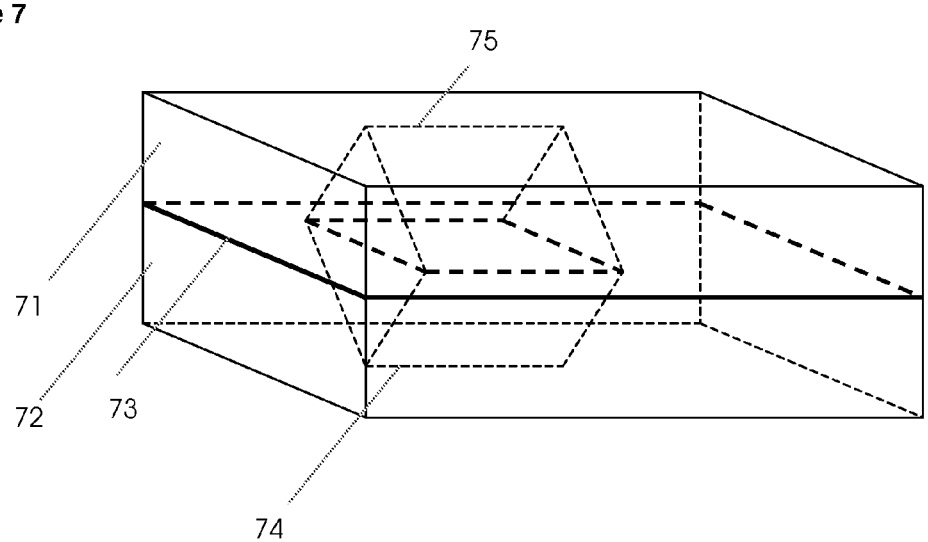
FIG. 7 shows how the input and output prisms are cut out of the bonded plates in the method of fabrication that uses a sheet fabrication process.

An alternative fabrication process is described next. This process is similar to the general process above, except that in step 1 only sheets are fabricated, with surfaces of sufficient quality for the subsequent bonding step as described in step 1 above. The coating and bonding steps are then carried out as described above. Now a step is added, in which the input and output devices are fabricated together, out of the bonded sheets. For example, the sheets can be fabricated by cutting, grinding, and polishing into cubes, in which the internal coated and bonded structure is on the diagonal, as shown in FIG. 7. After the bond the thin film structure 73 is situated between the two plates 71, 72. The input element (a prism) and the output element (a prism) 74, 75 are cut out and the surfaces are polished. This sheet fabrication process can improve the chances of success for optical contacting, because the shapes of the sheets in this alternative fabrication process are more uniform than the shapes of the finished input and output devices. This sheet fabrication process also permits the use of a back-side coating to correct the stress-induced deformation from the coating, which can improve the optical contacting process.

Here we describe a specialized fabrication method for an asymmetrical two-waveguide filter that uses different-order waveguide resonances. In this case the layer thickness and refractive index are also critical, but they are not matched. There is, however, a relative matching condition that will result in a successful filter that is described as follows. For a given wavelength and a given thickness for the first waveguide layer that is near the ideal design thickness for that layer (e.g. within a few parts per hundred), there is an optimum thickness for the second waveguide layer and an optimum angle of incidence that will result in a maximum transmission. We can construct the filter with a spatial variation in the thickness of one of the waveguides. Because the performance of the filter is less sensitive to layer thickness variations for the low refractive index layers, we can instead use a spatial variation of the thickness for all the layers of the first half or second half of the layer structure. This is slightly more convenient because the structure can be deposited in two coating runs rather than three.

Figure 8A:
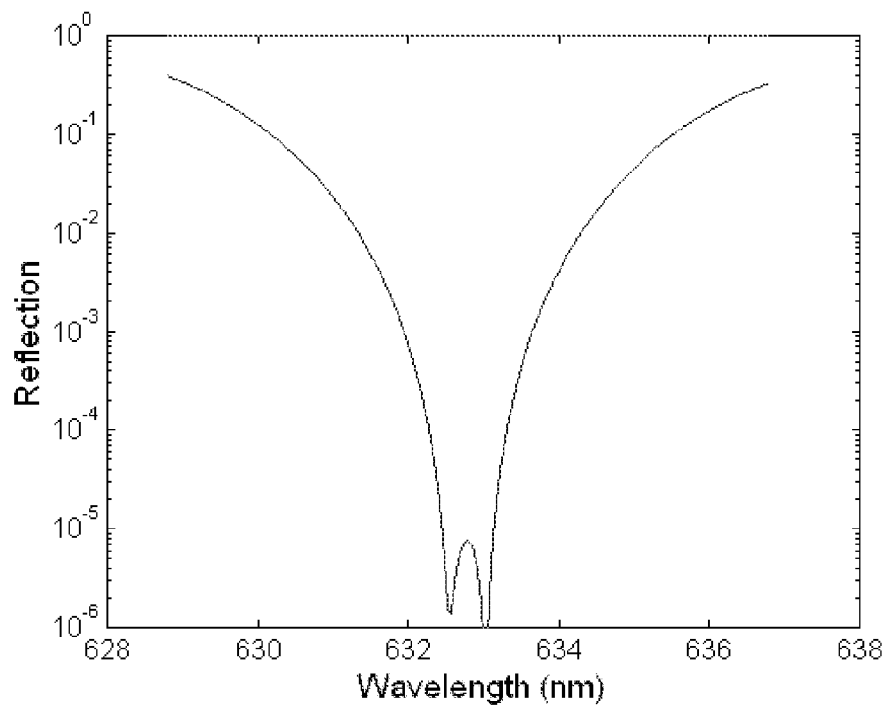
FIG. 8A shows model results for an asymmetrical two-waveguide filter that is designed to transmit at 632.8 nm. Reflection is shown as a function of wavelength. In the fabrication method described, spatial tuning in one or two directions will be used to correct for typical manufacturing errors.

We demonstrate this tuning procedure theoretically in FIG. 8A, FIG. 8B, FIG. 8C, and FIG. 8D. The theoretical curves shown are in reflection, on a log scale, which amplifies small differences near the peak of the spectral transmission (which is a dip in the reflection). The case we use for demonstrative purpose assumes lossless materials, so that the transmission is given by T=1−R, where R is the reflection. The tuning technique that we demonstrate here is still valid when the materials have losses due to absorption or scattering. FIG. 8A shows an asymmetrical two-waveguide design that is optimized for less than 10−4 reflection at 632.8 nm for angle of Incidence 58 degrees. For the same thin film material parameters used for discussing the symmetrical demonstration filter, the layer thickness values are: (Medium Si3N4); 217.0 nm SiO2; 338.62 nm Ta2O5; 514.7 nm SiO2; 91.301 nm Ta2O5; 295.0 nm SiO2 (Substrate Si3N4). A standard value is used for the Si3N4 refractive index (2.0164 at 589.59 nm). Dispersion is included in the modeling for all materials.

Figure 8B:
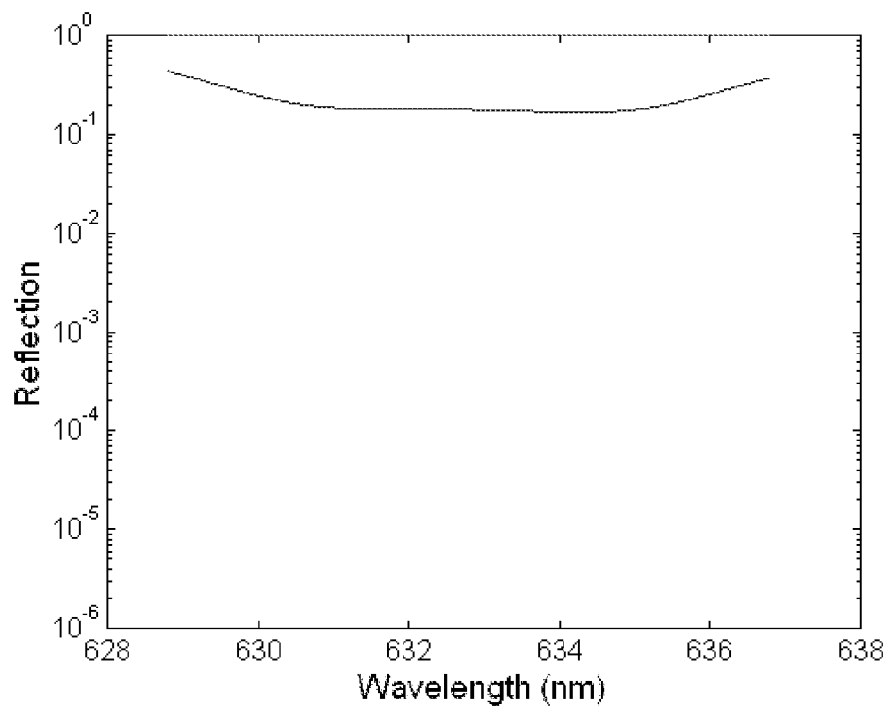
FIG. 8B shows results for the same model as FIG. 8A, except that layer thickness values are changed slightly to represent typical manufacturing errors.

The bandwidth for OD4 rejection is about 1 nm. The layer structure reflects light outside of the narrow window from 300 nm to about 1500 nm (with R>90%). For angles of incidence that are different than 58 degrees, the design will reflect at all wavelengths. (The reflection dip rises to 50% for angles 57.65 degrees and 58.25 degrees.) FIG. 8B shows the same reflection calculation for slightly different layer thickness values, modified by factors 1.005, 0.9975, 0.995, 1.0025, 1.005 for layers 1, 2, 3, 4, 5, respectively. These represent random errors in layer thickness for a typical IBS deposition system with high-quality layer thickness control.

Figure 8C:
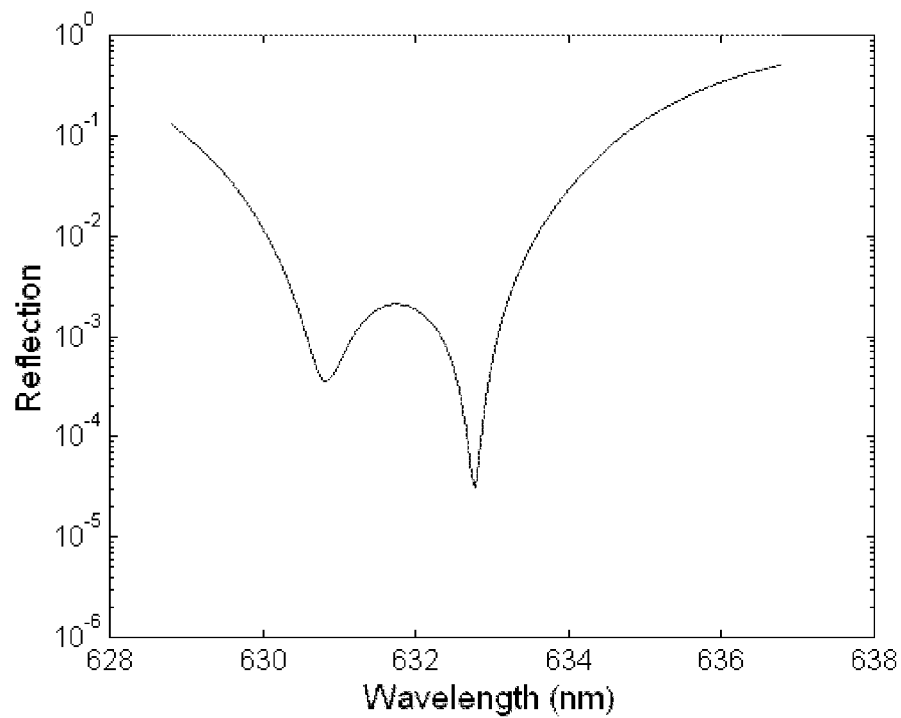
FIG. 8C shows the model result of FIG. 8B after using spatial tuning of the thickness for the layers in the second part of the design. All layers in the second part of the design are changed by the same factor. With tuning of this factor by spatial translation, and by adjusting the angle of incidence slightly, the filter reflects less than $10^{-4}$ of the incident light at the target wavelength (632.8 nm in this example).
Figure 8D:
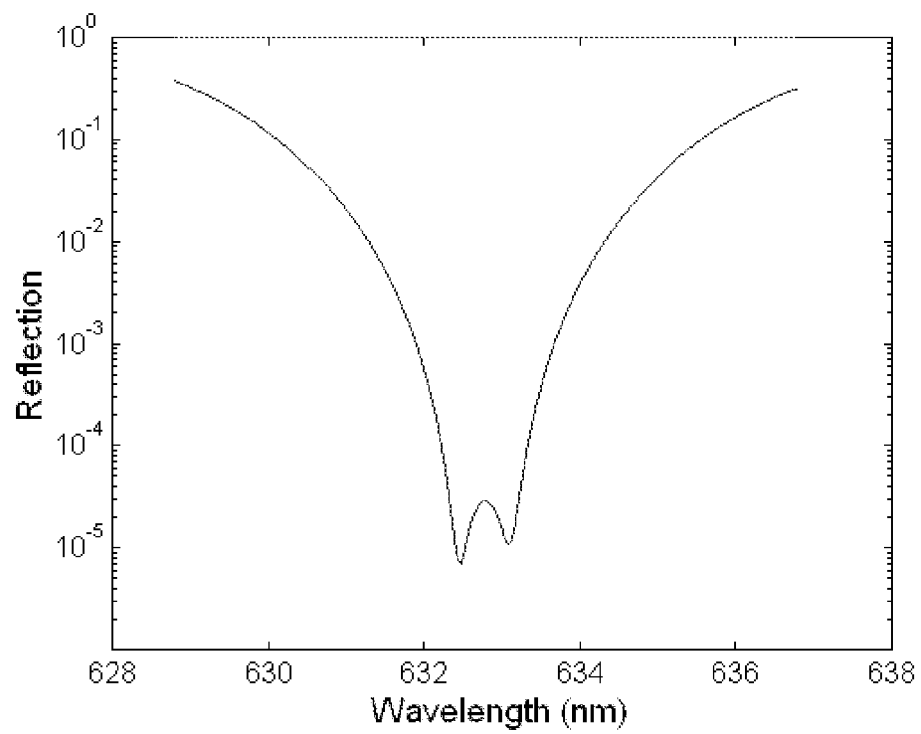
FIG. 8D shows model results of FIG. 8B after using spatial tuning in one direction for changing the thickness for the layers of the second part of the design by a factor, as in FIG. 8C, by spatial tuning in the other direction for tuning the thickness of layer 3, and by adjusting the angle of incidence slightly. By this tuning process the ideal design performance is nearly recovered.

Until now we have been considering coatings of uniform thickness, with at most very slight spatial thickness variations that arise in fabrication. Now consider a deposition process that is spatially-varying, where the first part of the design (up to the middle of layer 3) is uniform and the second part of the design varies slightly. We represent this by a tuning factor that varies as the filter is translated in the z direction. The layer thickness for layers in the second part of the design are multiplied by this tuning factor. We also allow slight tuning in angle, represented by a change in the angle of incidence. FIG. 8C shows the reflection curve after the angle of incidence is changed to 57.7 degrees (change of 0.3 degrees) and the tuning factor is adjusted to 0.9939. The rejection is better than OD4 at 632.8 nm, with a bandwidth of about 0.25 nm. Now consider a spatial design in which the middle layer (layer 3) thickness also varies in the other spatial direction. Now we have three tuning mechanisms: translation in z (tuning factor), rotation (angle of incidence), and horizontal translation (layer 3 thickness). FIG. 8D shows the result after adjusting all three. Note that the reflection curve is quite similar to that of the original ideal design.

This can be accomplished by a spatially-varying coating in which the first half of the coating run has a spatial variation, while the second does not. It would also work to coat both halves of the design with a spatial variation, and arrange the orientations of the parts in the coating chamber so that for spatial translation in one direction the first half of the structure is increasing in thickness, while the second half of the structure is decreasing in thickness. Then after the parts are bonded we can search for the spatial position for which relative matching occurs by performing a tuning procedure that involves translations and slight rotations of the filter until the optimum point is located. This fabrication and subsequent tuning procedure increases the thickness tolerance on the critical waveguide layers from about 5 parts in 10,000 to roughly 3 parts in 100.

Many of the embodiments have very broad blocking bands without the use of absorptive materials, so that tunable filters based on the devices disclosed here can be made that have very large tuning ranges. We already described simple tilt-tuning for a filter for which all waveguide structures are identical. We also described using a spatial variation in part of the layer structure for manufacturing a two-waveguide asymmetrical filter, and this technique can also be used in order to make a tunable filter, since a different wavelength will be resonant with both waveguides at a certain angle and spatial position.

Figure 9A:
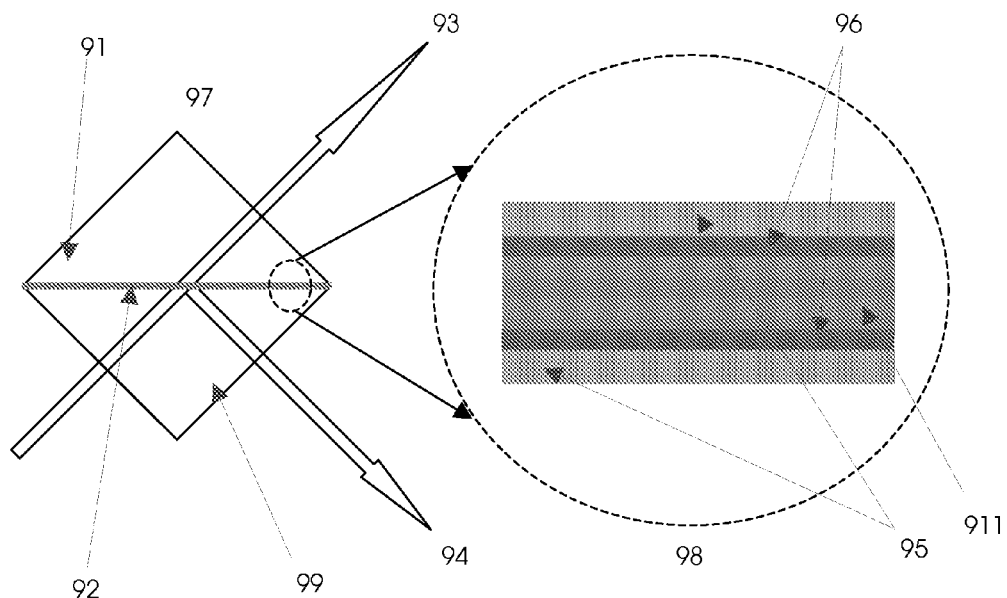
FIG. 9A is a schematic representation of an embodiment of a filter. It comprises two planar waveguide layers 96 and three spacer layers (95 and 911), with the refractive index of the middle spacer layer 911 being a function of temperature. In this example, the entrance prism 99 is identical to the exit prism 91.

In a further embodiment, there is provided a structure according to any of the embodiments described from embodiment 1 to embodiment 3, wherein any material or any number of materials used in the optical construction of the filter, either the thin film structure or the input prism or the output prism, have a refractive index that can be controlled, by an external stimulus, including but not limited to, electric field or magnetic field or temperature or stress or pressure or another electromagnetic field. This controllable refractive index may be used to control the transmission or polarisation properties of the structure. The example shown here is depicted in FIG. 9A, and comprises:

Input prism 99, assumed to be of an isotropic material, with refractive index 1.67

First layer, adjacent to the input prism, assumed to be of an isotropic material, with refractive index 1.36, and a thickness of 0.38 microns Second layer, adjacent to the first layer, assumed to be of an isotropic material, with refractive index 1.65, and a thickness of 0.09 microns Third layer 911, adjacent to the second layer, assumed to be of an isotropic material, with refractive index related to the temperature, T, by the formula n=−0.0004677T+1.5262535, where T is the temperature in degrees centigrade, and a thickness of 1 micron Fourth layer, adjacent to the third layer, assumed to be of an isotropic material, with refractive index 1.65, and a thickness of 0.09 microns Fifth layer, adjacent to the fourth layer, assumed to be of an isotropic material, with refractive index 1.36, and a thickness of 0.38 microns Output prism 91, assumed to be of an isotropic material, with refractive index 1.67, in optical contact with the fifth layer This is a five-layer structure wherein the two high refractive index planar waveguide layers 96 are identical, and the two outside spacer layers 95 adjacent to the prisms are identical. The third spacer layer (central spacer layer) 911 is a one-micron thick layer of methyl benzoate, which is an organic fluid with the chemical formula C6H5COOCH3. Methyl benzoate is known to have a very strong dependence of refractive index on temperature, approximately given, in the range T=15 degrees centigrade to 45 degrees centigrade, by n=−0.0004677T+1.5262535, where n is the refractive index and T is the temperature in degrees centigrade. The ability to control the transmission band by changing the temperature is demonstrated by computer simulations.

The specific tunable structure presented in this embodiment is one that is temperature sensitive, exploiting the large temperature dependence on the refractive index of methyl benzoate. However, other structures can be designed that exploit different effects, such as, but not limited to, (i) the electro-optic effect; (ii) the magneto-optic effect and (iii) the photo-elastic effect. These effects all change the refractive index of a material, so in each case the implementation is similar to the method described here, in which the temperature modifies the refractive index of the material.

Figure 9B:
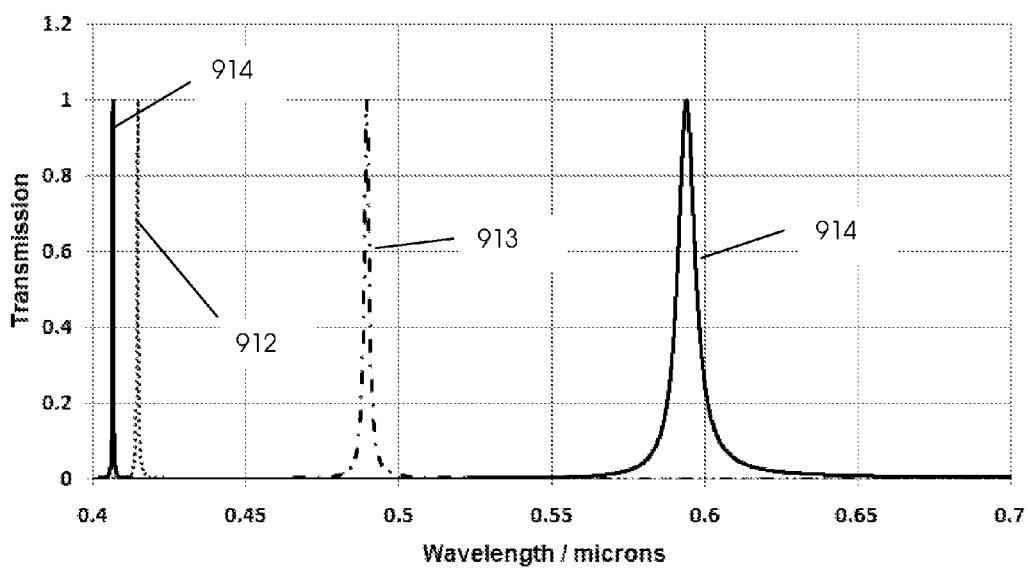
FIG. 9B shows the transmission of TE polarized light at an angle of incidence θ=65 degrees, where θ is defined as the angle between the path of the beam and a line at 90 degrees to the plane of the multilayer coating. θ is measured within the coupling prism, as shown in FIG. 1A. Curves 912, 913 and 914 are calculated at temperatures of 35, 25 and 15 degrees centigrade respectively.

In the enlargement 98, the spacer layers 95 and high refractive index planar waveguide layers 96 are solid films. The thermally sensitive material (in this case methyl benzoate) is the middle layer 911, assumed to be 1 micron thick. At temperatures of 35 degrees centigrade, 25 degrees centigrade and 15 degrees centigrade, the spectral transmission curves at theta=65 degrees are shown in FIG. 9B as curves 912, 913 and 914 respectively. FIG. 9B shows that the spectral transmission peak shifts from approximately 406 nm to 594 nm over a temperature range of 20 degrees centigrade.

Curve 914 in FIG. 9B has two peaks in the range of wavelengths from 0.4 microns to 0.7 microns. The peak near 0.406 microns is a different mode, also with intensity peaks in both the high-index waveguide layers 96 of FIG. 9A and the liquid layer 911 of FIG. 9A.

The total number of layers is very small for the filter disclosed here, so that fabricating these filters with spatially-varying layer thickness values is quite feasible using available techniques. The spatial variations can be made for individual layers or for small groups of layers. A tunable filter can be designed by designing structures with the desired filter parameters at a number of spatial positions, and then interpolating the thickness values for spatial positions between the positions of design. The method of design that has been described can be used at each individual position, although tunable embodiments can be designed using any other method of design for determining the structural design at each spatial position.

Figure 10:
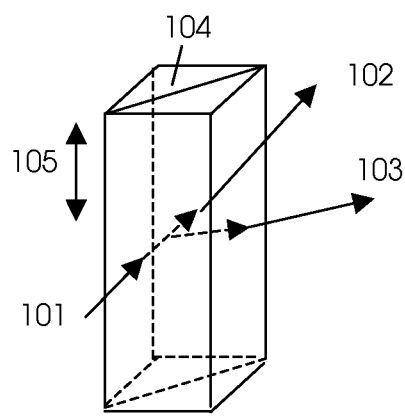
FIG. 10 shows an exemplary embodiment of a filter that is spatially tunable. The incoming beam 101 is split from the internal thin film structure on the diagonal of the rectangular prism 104 into a transmitted beam 102 and a reflected beam 103. Vertical translations of the filter 105 cause the incoming beam to reflect on different parts of the thin film structure. The thin film structure on the diagonal is spatially varying, effectively changing the layer thickness (where the beam interacts with the thin film coating), thus changing the spectral behaviour of the filter.
Figure 11:
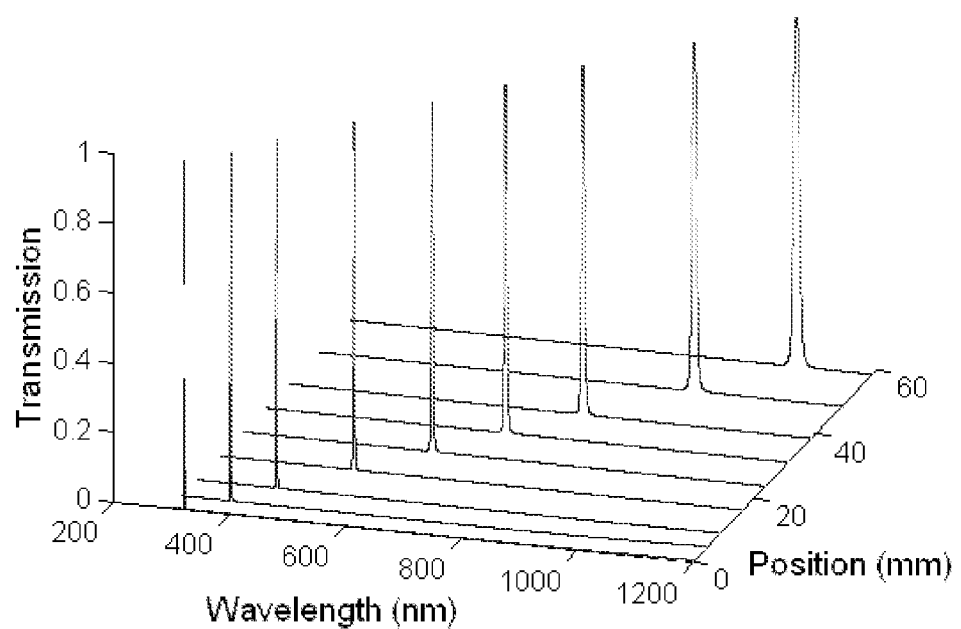
FIG. 11 are results from model calculations of transmission for the embodiment of a symmetrical two-waveguide design, demonstrating the wide tunability. Simulated spectral curves are shown for various spatial positions on the thin film coating, indicated on the right.

FIG. 10 shows an embodiment of this design method that uses a coating that varies spatially in the vertical direction (105), and vertical movement of the filter or the light as a tuning mechanism. A light beam (101) enters the input prism and is incident on the thin film layers that are on the diagonal of the rectangular prism (104). The thin film layers transmit light (102) or reflect light specularly (103). FIG. 11 shows solutions corresponding to the set of layer thickness values shown in Table 2.

TABLE 2

| Layers 1 and 5 | Layers 2 and 4 | Layer 3 |
|---|---|---|
| 207.8 | 42.5 | 415.6 |
| 192.5 | 50 | 385 |
| 231.5 | 60 | 463 |
| 287 | 75 | 574 |
| 344 | 90 | 688 |
| 384.5 | 105 | 769 |
| 443 | 120 | 886 |
| 504 | 140 | 1008 |
| 549 | 160 | 1098 |

The columns are thickness values given in nm. The high refractive index layers (layer 2 and layer 4) are Ta2O5 and the low refractive index layers (layer 1, layer 3, and layer 5) are SiO2. The medium and substrate are models for Si3N4. A dispersive model without extinction is used for the materials. Refractive index values at 589.59 nm are Ta2O5 2.1414, SiO2 1.4859, and Si3N4 2.0164.

These are typical refractive index values for the listed materials, and typical dispersion is assumed for the index at other wavelengths. The angle of incidence is 58 degrees for all designs in Table 2.

If we assume a tuning mechanism that is shown in FIG. 11, using a spatially-varying design such that at the position z in mm, the thickness of layers (2) and (4) are given by 42.5 nm+(2 nm/mm)×z, then each of the designs in Table 2 will correspond to a spatial position, z, on the device. Between the spatial positions corresponding to designs in Table 2, the spatially-varying coating will change smoothly. The thickness values of the layers will therefore change smoothly as a function of spatial position, and the peak position will vary smoothly as the filter is translated. The design between the positions corresponding to Table 2 can be approximated by linear interpolation (or other forms of interpolation). FIG. 11 shows the theoretical spectral transmission as a function of wavelength and spatial position for a small beam diameter, using linear interpolation. If the beam diameter is small enough (less than about 1 mm in this case), then the spectral changes corresponding to translations across the beam diameter are small in comparison to the wavelength width of the filter. Some variation in the spectrum across the beam diameter can be tolerated, and in this case the spectral transmission would be a convolution of the beam intensity profile and the spectral profiles at each position. This example of the embodiment tunes continuously from 322 nm to 1069 nm, which is well over a factor of 3 in wavelength (or frequency). In this example the layer thickness values are adjusted to maintain a fixed wavelength width in wave numbers of 100 cm−1. It is a simple matter to adjust the layer thickness values so that the wavelength width is constant in wavelength, or practically any other function of peak wavelength. To a good approximation, the wavelength width of the transmission window is modified by changing the thickness of low refractive index layers, while the peak wavelength is modified by changing the thickness of the high refractive index waveguide layers.

Any of the tunable embodiments of the filter can also be used in reflection as a notch filter, that the filter rejects the light that is transmitted. The tunable embodiments can also be used as both a tunable bandpass filter and as a notch filter, as shown in FIG. 5. For some embodiments, it might be helpful to use a spatial variation in a second spatial direction and a tuning procedure, as described for accommodating layer thickness and refractive index errors for a two-waveguide asymmetrical filter, in order to minimize the reflection at the peak transmission wavelength.

Figure 12:
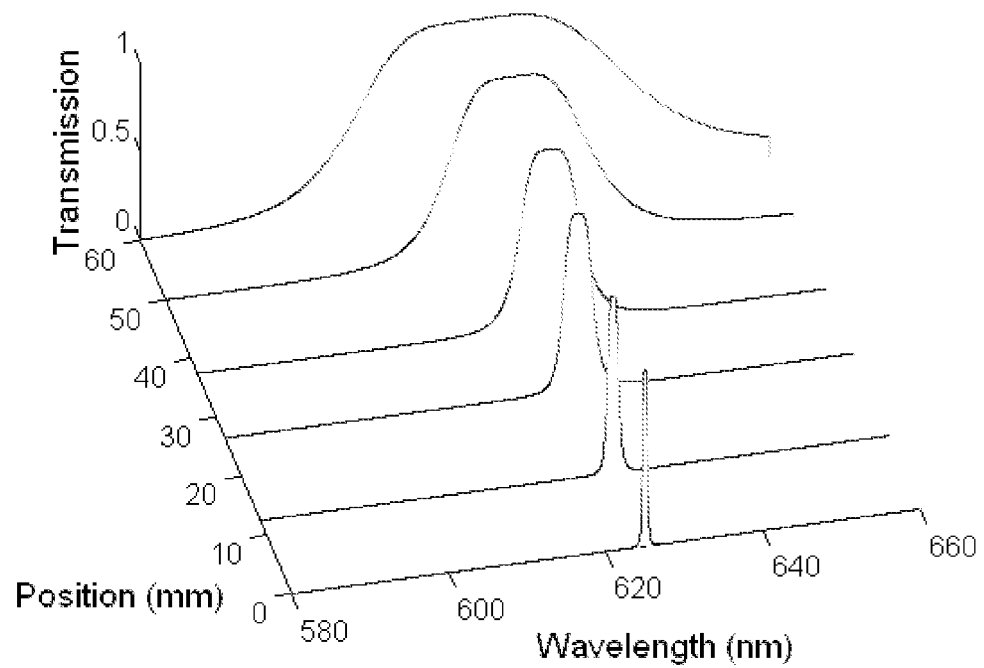
FIG. 12 shows results from model calculations of transmission for the embodiment of a symmetrical two-waveguide design in which the wavelength width is widely tunable. Spectral curves are shown for various spatial positions on the thin film coating, indicated on the left.

The same symmetrical two-waveguide design can be used for a filter with an adjustable wavelength width. For this embodiment the thickness values of the low refractive index layers are varied as a function of spatial position, possibly with slight variations in the thickness of high refractive index layers. FIG. 12 shows an example of this embodiment that starts with the design corresponding to the 5th row of table 2, but with the layer 1 (and 5) thickness varying spatially according to (450 nm)-(4 nm/mm)×z, where z is the vertical position as seen in FIG. 10, in mm. (The position z=26.5 mm corresponds exactly to the 5th row of table 2.) At each position, the thickness of the other values are optimized to keep the central maximum the same and to maintain a flat-top shape. For this design, over the spatial region z=0 to z=60 mm, the full-width-half-maximum (FWHM) varies continuously from 0.65 nm to 36.6 nm. The FWHM can be continuously tunable over many orders of magnitude in this way.

Another embodiment is to vary the angle at the same time that the spatial position is varied. The method of design is similar, except that each design corresponding to a spatial position is also designed for a different angle of incidence. An example is to vary the angle in order to adjust the maximum transmission frequency, while using the spatial variation to control the wavelength width. With this technique, a tunable filter can be designed in which the spatial tuning region is smaller for a given beam width, resulting in a more compact tunable filter. This embodiment can also be tunable in both wavelength of maximum transmission and wavelength width. It is possible to design a filter that tunes in three parameters by using independent motion in two spatial dimensions and the angle.

Various manufacturing techniques can be applied to achieving the desired layer thickness versus spatial position, including, but not limited to, hard edges placed above the surface under deposition, screen filters with hole diameters and hole densities that vary in a way that will produce the desired spatial variation, and tilting the parts so that the source is further away for part of the surface. These techniques for achieving a spatially-dependent thin film coating are applied in the coating step of the fabrication methods that are disclosed above.

For the coating step, layer thickness and refractive index tolerances can be relaxed by using a spatially-varying coating in one spatial dimension to accommodate layer thickness errors, while also using a spatially-varying coating in another dimension for the tuning We have already demonstrated that a combination of angle adjustments and spatial variation in a single dimension can accommodate layer thickness errors and provide for tunability for the two-waveguide asymmetrical filter. We can add wavelength width control in the other available spatial dimension, an embodiment that provides for tuning in wavelength of maximum transmission, wavelength width, and the accommodation of errors in layer thickness or refractive index.

The tunable filter embodiments disclosed here can be used in transmission as bandpass filters, or in reflection as notch filters. The accommodation of errors in layer thickness and refractive index by spatial variations in the coatings or by a tunable refractive index, is particularly important for using the filter in reflection as a notch filter. As an example, a notch filter may be required that rejects laser light to values of 10−4 (OD4), which for two-waveguide filters disclosed here require a layer thickness control on the order of 2×10−4 (0.02%). The tight layer control may be possible with optical monitoring techniques that are used in making multi-cavity filters for telecommunication, but the design is also very sensitive to absolute material refractive index values, so manufacturing would be quite challenging. This difficulty in manufacturing can be overcome with a spatially varying coating design as described in FIG. 8.

Figure 13A:
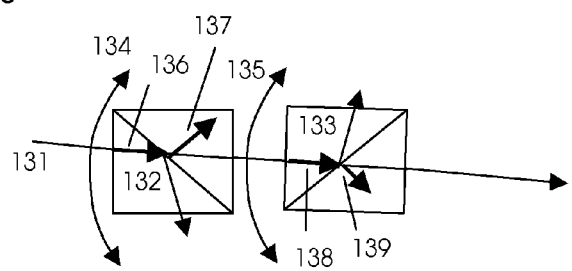
FIG. 13A shows embodiments of a filter that comprises two filters as described previously except that the thin film structure on the hypotenuse 131, 132 may comprise only a single waveguide structure. After alignment by rotation of both individual filters independently 134, 135, the filter achieves angle filtering in the sense that for light entering in directions that are different from the selected ray 131, no light at within a wide spectral region is transmitted. The diagonal elements 132, 133 are each symmetrical one- or multiple-waveguide structures. The structure can be rotated for changing the angle of incidence to these thin film structures, for example to tune the peak transmission wavelength 134.

Filter embodiments described here that comprise identical waveguide structures do not act as spatial filters because they exhibit angle tuning, where some light outside the selected range (second wavelength band) is transmitted if it enters at a certain different angle. A filter that also acts as a spatial filter can be constructed from two filters with identical waveguide structures by using angles of incidence that are in opposite directions, as shown in FIG. 13A. The first filter with a thin film structure 132 is placed in the beam path 131 that has wavelength in the second wavelength band, and the angle is adjusted 134 so that the transmission is maximum, where after refraction the internal direction of propagation in the input device is $\hat{k}_2$ 136, which assures that the incoming angle is in the second angular band. A second filter with the same peak transmission wavelength, also with a thin film structure 133, is placed in the beam behind the first filter, and its angle is also adjusted for maximum transmission, where after refraction the internal direction of propagation in the input device is $\hat{k}_2$ 138, which assures that the incoming angle is within the second angular band for the second filter. Each filter has a planar thin film structure, which have normal directions $\hat{n}_1$ 137 and $\hat{n}_2$ 139 we define for each so that the angle between the internal direction of propagation and the angle of the normal is non-zero and acute. The planar film structure of the second is arranged to be in to opposite direction in the rotational sense, more formally being stated by the condition that $(\hat{k}_1 \times \hat{n}_1)$ and $(\hat{k}_2 \times \hat{n}_2)$ are in opposite directions. Light with a range of incoming directions will be spatially filtered by this angle filtering. we demonstrate below that this filter achieves true angle filtering (spatial filtering) in the same sense that the asymmetrical two-waveguide thin film structure does, acting as a bandpass filter, polarizer, and spatial filter. The thin film structure on the diagonal surfaces of each filter 132, 133 can also be based on one-waveguide or multi-waveguides. Although the single-waveguide filter is not novel, the combining of two in this way it is believed to be novel.

Figure 13B:
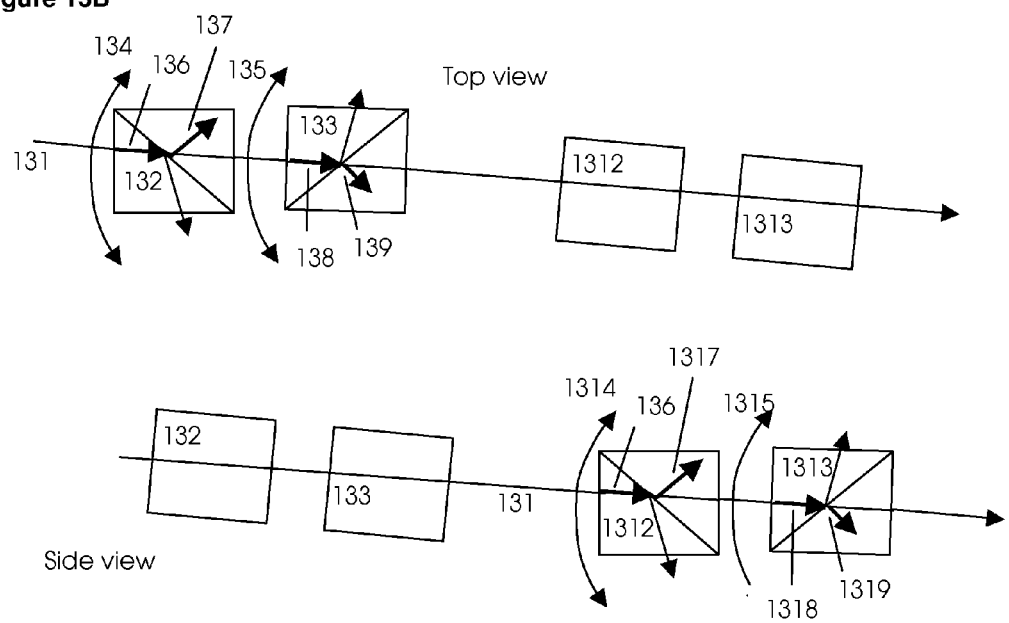
FIG. 13B shows an embodiment of an optical device than comprises the pair of filters as described in FIG. 13A, and another pair of filters that also transmits the same electromagnetic radiation, but with the planar thin film structures oriented relative to the planar thin film structures of the first by 90 degrees about the direction of propagation of the light in the input element material. The structure is shown in both top view and side view in order to show the three-dimensional angles. This optical device achieves angle filtering as described in FIG. 13A in both vertical and horizontal directions.

Another related optical device is shown in FIG. 13B. Here there are two pairs of optical filter as described above and shown in FIG. 13A. The first filter pair is placed so that it maximally transmits the selected polarization component of a beam of electromagnetic radiation that has a certain incoming direction and a wavelength corresponding to the peak transmission wavelength of the filter. The second filter pair is constructed and placed so that it also maximally transmits the same beam of radiation after it emerges from the first filter pair. If the first pair of filters transmits polarized light in the TE polarization relative to the angle of incidence of the planar thin film structures of its filters, then the second filter pairs are constructed to transmit the TM polarization, and if the first transmits TM then the second transmits TE. This geometry can be described in terms of the cross products of a vectors shown in FIG. 13B. The first filter pair is the same as in FIG. 13A, and has the same corresponding elements 132, 133, 134, 135, 136, 137, 138, 139. The second filter pair also has elements 1312, 1313, 1314, 1315, 1316, 1317, 1318, 1319 that correspond to the same elements, respectively. The incoming light 131 beam enters the first filter, and after possible refraction there is an internal direction of maximum transmission $\hat{k}_1$ 136 and the planar thin film structure of the first filter has a normal direction $\hat{n}_1$ 137 that for purposes here we define as the vector that makes a non-zero acute angle with the first vector, as shown. The third filter, which is the first filter of the second filter pair, has a corresponding internal direction of maximum propagation $\hat{k}_3$ and normal direction to its planar thin film structure, $\hat{n}_3$ 1317. The relative orientation of the second filter can be described by stating that $(\hat{k}_1 \times \hat{n}_1) \cdot (\hat{k}_3 \times \hat{n}_3) = 0$, or that the vectors $(\hat{k}_1 \times \hat{n}_1)$ and $(\hat{k}_3 \times \hat{n}_3)$ are perpendicular. This filter will achieve spatial filtering in two directions, corresponding in the embodiment shown in FIG. 13B to altitude (vertical) and azimuth (horizontal) angles. A similar device can be made of just two filters instead of two pairs of filters, if the filters are as in the first embodiment or the second embodiment above.

Figure 13C:
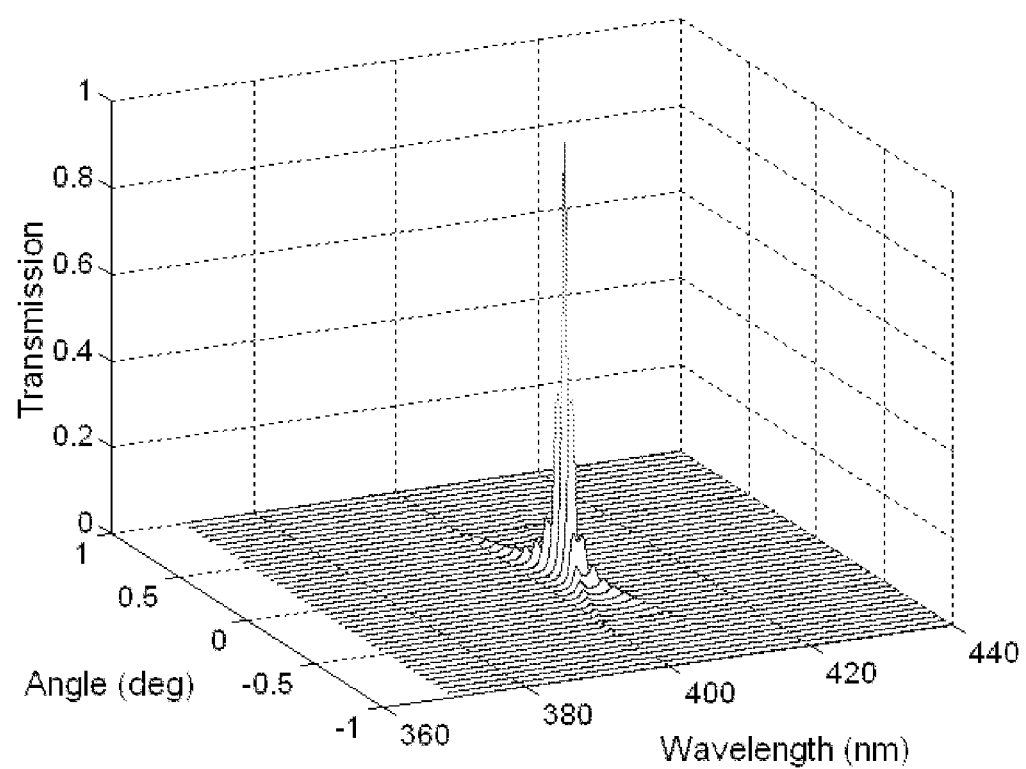
FIG. 13C shows simulated results for an example of this embodiment, based on perfectly matched one-waveguide structures. The angle is the tuning angle, relative to the ideal selected input ray 131 shown in FIG. 13A.

FIG. 13C shows the calculated transmission for an embodiment of the filter shown in FIG. 13A, in this case consisting of two single-waveguide thin film structures that are identical except that the angles of incidence are in opposite directions. The design for both single-waveguide structures is: Angle of incidence 60°, layers: (Medium SF11); SiO2 308.0 nm; Ta2O5 157.09 nm; SiO2 308.0 nm (Substrate SF11). Typical dispersion for the materials is assumed, with refractive index values at 405 nm: SiO2 1.4978; Ta2O5 2.2360; SF11 1.8422.

In an exemplary embodiment, the first wavelength band may comprise wavelengths bounded by 140 nm and 9000 nm.

Immaterial modifications may be made to what is described here without departing from what is claimed.

What is claimed is:

1. A filter comprising:
an input element that is at least partially transparent to electromagnetic radiation with a wavelength at least within a first wavelength band and a direction within a first angular band, and has properties including a first refractive index;
an output element that is at least partially transparent to electromagnetic radiation with a wavelength at least within the first wavelength band and a direction within the first angular band, and has properties including a second refractive index; and
a thin film structure comprising a series of optically-coupled waveguide structures between the input element and the output element, the series of optically-coupled waveguide structures comprising at least a first planar waveguide structure in optical contact with the input element and a second planar waveguide structure in optical contact with the output element, each waveguide structure of the series of optically-coupled waveguide structures supporting at least a first waveguide mode and being a leaky waveguide comprising a core and cladding,
wherein the first refractive index, the second refractive index, and the properties of each waveguide structure of the series of optically-coupled waveguide structures are selected to permit excitation of a resonant mode in the thin film structure, the resonant mode having an effective dispersion, by evanescent coupling of a selected polarization component of electromagnetic radiation of an angle within a second angular band that is within the first angular band and of a wavelength within a second wavelength band that is within the first wavelength band, thereby causing, in operation, transmission of the selected polarization component of electromagnetic radiation through the thin film structure without reflection of the selected polarization component of electromagnetic radiation from the thin film structure, the second wavelength band having parameters including a wavelength width and a peak transmission wavelength, and the second angular band having an angular width and a direction of maximum transmission, and wherein each optically-coupled waveguide structure of the series of optically-coupled waveguide structures comprises a first planar cladding layer, a second planar cladding layer, and a planar waveguide layer, and at least one of the first planar cladding layer, the second planar cladding layer, and the planar waveguide layer has a spatially varying thickness perpendicular to the plane of the respective first planar cladding layer, second planar cladding layer, or planar waveguide layer, whereby in operation of the filter the peak transmission wavelength of the second wavelength band varies spatially.

2. The filter of claim 1 in which the first wavelength band comprises wavelengths bounded by 140 nm and 9000 nm.

3. The filter of claim 1 in which the input element is a first prism and the output element is a second prism.

4. The filter of claim 1 in which the input element is a first grating and the output element is a second grating.

5. The filter of claim 1 in which the series of optically-coupled waveguide structures comprises a third planar waveguide structure.

6. The filter of claim 1 in which the series of optically-coupled waveguide structures consists of the first planar waveguide structure and the second planar waveguide structure.

7. The filter of claim 1 in which the resonant modes of each waveguide structure in the series of optically-coupled waveguide structures have a different effective dispersion, thereby in use causing reflection from the thin film structure without transmission through the thin film structure of electromagnetic radiation within the first angular band but outside the second angular band.

8. The filter of claim 1 in which one or more of the input element, output element, cladding or core of any one or more of the optically-coupled waveguide structures comprise a material having a controllable refractive index.

9. A filter comprising:
an input element that is at least partially transparent to electromagnetic radiation with a wavelength at least within a first wavelength band and a direction within a first angular band, and has properties including a first refractive index;
an output element that is at least partially transparent to electromagnetic radiation with a wavelength at least within the first wavelength band and a direction within the first angular band, and has properties including a second refractive index; and
a thin film structure comprising a series of optically-coupled waveguide structures between the input element and the output element, the series of optically-coupled waveguide structures comprising at least a first planar waveguide structure in optical contact with the input element and a second planar waveguide structure in optical contact with the output element, each waveguide structure of the series of optically-coupled waveguide structures supporting at least a first waveguide mode and being a leaky waveguide comprising a core and cladding,
wherein the first refractive index, the second refractive index, and the properties of each waveguide structure of the series of optically-coupled waveguide structures are selected to permit excitation of a resonant mode in the thin film structure, the resonant mode having an effective dispersion, by evanescent coupling of a selected polarization component of electromagnetic radiation of an angle within a second angular band that is within the first angular band and of a wavelength within a second wavelength band that is within the first wavelength band, thereby causing in operation transmission of the selected polarization component of electromagnetic radiation through the thin film structure without reflection of the selected polarization component of electromagnetic radiation from the thin film structure, the second wavelength band having parameters including a wavelength width and a peak transmission wavelength, and the second angular band having an angular width and a direction of maximum transmission; and wherein each optically-coupled waveguide structure of the series of optically-coupled waveguide structures comprises a first planar cladding layer, a second planar cladding layer, and a planar waveguide layer, and at least one of the first planar cladding layer, the second planar cladding layer, and the planar waveguide layer has a spatially varying thickness perpendicular to the plane of the respective first planar cladding layer, second planar cladding layer, or planar waveguide layer, whereby in operation of the filter the wavelength width of the second wavelength band varies spatially.

10. The filter of claim 1 wherein in operation of the filter the wavelength width of the second wavelength band varies spatially.

11. The filter of claim 1 wherein in operation of the filter the peak transmission wavelength of the second wavelength band varies spatially in a first direction along the thin film structure and the wavelength width of the second wavelength band varies spatially in a second direction along the thin film structure, the first direction being different from the second direction.

12. An optical structure comprising a first filter with a first internal direction of maximum transmission, a first planar thin film structure having a first normal direction that makes a non-zero acute angle with the first internal direction of maximum transmission, a second filter with a second internal direction of maximum transmission, and a second planar thin film structure having a second normal direction that makes a non-zero acute angle with the second internal direction of maximum transmission, the second filter being placed so that a beam of electromagnetic radiation that is incident on the first filter and maximally transmitted will also be maximally transmitted by the second filter, and also so that the cross product of a vector in the first direction of maximum transmission and a vector in the direction of the first normal direction, and the cross product of a vector in the second direction of maximum transmission and a vector in the second normal direction, will be opposite in directions, in which the angles of incidence for the two filters are opposite in a rotational sense, each of the first filter and the second filter being constructed in accordance with claim 1.

13. A filter comprising an optical structure in accordance with claim 12, wherein the output element of the first filter and the input element of the second filter are combined into a single element.

14. An optical structure comprising a first filter pair comprising a first filter and a second filter constructed in accordance with claim 12, with the first filter having a first internal direction of maximum transmission, and a first planar thin film structure having a first normal direction that makes a non-zero acute angle with the first internal direction of maximum transmission, and a second filter pair comprising a third filter and a fourth filter constructed in accordance with claim 12, with the third filter having a third internal direction of maximum transmission, and a third planar thin film structure having a third normal direction that makes a non-zero acute angle with the third internal direction of maximum transmission, the second filter pair being placed so that a beam of electromagnetic radiation that is incident on the first filter pair and maximally transmitted will also be maximally transmitted by the second filter pair, and also so that the cross product of a vector in the first direction of maximum transmission and a vector in the direction of the first normal direction, and the cross product of a vector in the third direction of maximum transmission and a vector in the third normal direction, will be perpendicular in direction, in which the angles of incidence for the first filter and the third filter are rotated about their directions of maximum transmission by 90 degrees with respect to each other.

15. A filter comprising an optical structure in accordance with claim 14, wherein the output element of the second filter and the input element of the third filter are combined into a single element.

16. The filter of claim 1 in which the input element has a coating.

17. The filter of claim 16 in which the coating of the input element has a spatial variation.

18. The filter of claim 1 in which the output element has a coating.

19. The filter of claim 18 in which the coating of the output element has a spatial variation.

* * * * *